(12) United States Patent
Ozaki

(10) Patent No.: US 7,104,354 B2
(45) Date of Patent: Sep. 12, 2006

(54) VEHICLE COLLISION STATE DETECTING DEVICE

(75) Inventor: Tatsuya Ozaki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 418 days.

(21) Appl. No.: 10/717,633

(22) Filed: Nov. 21, 2003

(65) Prior Publication Data

US 2004/0129479 A1    Jul. 8, 2004

(30) Foreign Application Priority Data

Jan. 7, 2003    (JP)    ............................. 2003-001235

(51) Int. Cl.
*B60K 28/12*    (2006.01)

(52) U.S. Cl. ...................... 180/282; 280/735

(58) Field of Classification Search ................ 180/282, 180/274; 280/735, 734; 701/45; 340/668
See application file for complete search history.

(56) References Cited

U.S. PATENT DOCUMENTS

| | | | |
|---|---|---|---|
| 3,859,482 A * | 1/1975 | Matsui et al. ............ 200/61.08 |
| 5,179,256 A * | 1/1993 | Haglund .................... 200/52 R |
| 5,202,831 A * | 4/1993 | Blackburn et al. ............ 701/46 |
| 5,375,877 A * | 12/1994 | Yoshida et al. ............. 280/735 |
| 5,431,445 A * | 7/1995 | Wheatley ..................... 280/784 |
| 2004/0102882 A1* | 5/2004 | Sala et al. ..................... 701/45 |
| 2004/0102883 A1* | 5/2004 | Sala et al. ..................... 701/46 |
| 2005/0143886 A1* | 6/2005 | Theisen ....................... 701/45 |

FOREIGN PATENT DOCUMENTS

| | | |
|---|---|---|
| JP | 5-330401 A | 12/1993 |
| JP | 11-342821 A | 12/1999 |

* cited by examiner

*Primary Examiner*—Paul N. Dickson
*Assistant Examiner*—Drew J. Brown
(74) *Attorney, Agent, or Firm*—Global IP Counselors, LLP

(57) ABSTRACT

A vehicle collision state detecting device is configured to provide an extremely effective collision protection by identifying a wide range of collision states. The vehicle collision state detecting device basically comprises a front vehicle structural section, a tension member, left and right tensile force sensors and a collision state identifying section. The front vehicle structural section has a predetermined collision collapsing characteristic. The tension member has a prescribed initial tensile force extending in a width-wise direction of the front vehicle structural section. The tensile force sensors measure left and right tensile forces of the tension member. The tension member and the tensile force sensors form a collision sensing device in one possible embodiment. The collision state identifying section identifies a collision state of the vehicle. At least one passenger restraining device is activated differently depending on the detected collision state identified by the collision state identifying section.

21 Claims, 30 Drawing Sheets

FULL FRONT
COLLISION

OFFSET
COLLISION

POLE
COLLISION

OBLIQUE OFFSET
COLLISION

TABLE 1 AIRBAG DEPLOYMENT TIMING (INFLATOR IGNITION TIMING)

|  | SMALL CAR | MEDIUM CAR | LARGE CAR |
|---|---|---|---|
| FULL FRONT COLLISION | EARLIER | EARLIER | EARLIER |
| POLE COLLISION | | | |
| OBLIQUE OFFSET COLLISION | | | |
| OFFSET COLLISION | LATER | LATER | LATER |

|  | FRONT COLLISION | OFFSET COLLISION | POLE COLLISION | OBLIQUE COLLISION |
|---|---|---|---|---|
| THRESHOLD VALUE ($\Delta V$ VALUE) | LARGER | | | SMALLER |

VEHICLE COLLISION STATE DETECTING DEVICE

BACKGROUND OF THE INVENTION

1. Field of the Invention

The present invention generally relates to a vehicle collision state detecting device that detects the collision state of a vehicle. More specifically, the present invention relates to a vehicle collision state detecting device that identifies the type of collision to a front section of a vehicle.

2. Background Information

Technologies for anticipating a vehicle collision in advance have already been developed. Specific examples of such technologies are disclosed in Japanese Laid-Open Patent Publication No. 5-330401 and Japanese Laid-Open Patent Publication No. 11-342821, which are identified below.

Japanese Laid-Open Patent Publication No. 5-330401 discloses a collision detection sensor that effectively detects a vehicle collision, particularly a collision at a lateral side of the vehicle. The collision detection sensor of this publication is basically provided with an elongated substrate, a displacement converting mechanism and a detecting device. The elongated substrate is arranged along a side vehicle panel with the displacement converting mechanism and the detecting device provided on the substrate. The displacement converting mechanism functions to convert the amount of deformation displacement of the side vehicle panel in the thickness direction of the substrate into an amount of displacement in the lengthwise direction of the substrate. The detecting device operates in response to the displacement in the lengthwise direction of the substrate so as to emit a collision detection signal. Thus, with this collision detection sensor, a detecting device provided in one location on the elongated substrate can detect collision-related deformation of the vehicle panel over a wide range along the lengthwise direction of the substrate. Furthermore, assembly is simple and inexpensive with this collision detection sensor as well as the operation of this collision detection sensor is reliable.

Japanese Laid-Open Patent Publication No. 11-342821 discloses a vehicle-use passenger restricting device for restricting passengers. The vehicle-use passenger restricting device is provided with a sensor for predicting or detecting a rear collision and a control device configured to deploy an airbag in the vicinity of the passenger's neck area when the sensor detects a rear collision or predicts that a rear collision will occur. More specifically, this vehicle-use passenger restricting device is provided with a passenger state detecting device and an airbag deployment state changing device configured to change the deployment state of the airbag in accordance with the passenger state detected by the passenger state detecting device. Thus, with this vehicle-use passenger restricting device, the sensor detects rear collisions or predicts if one will occur and, when a rear collision is detected or it is predicted that one will occur, the control device deploys an airbag in the vicinity of the passenger's neck area. Additionally, the airbag deployment state changing device changes the deployment state of the airbag in accordance with the passenger state detected by the passenger state detecting device. As a result, an airbag deployment state that is well adapted to the state of the passenger can be ensured and the occurrence of a load on the cervical vertebrae can be sufficiently prevented in advance.

In view of the above, it will be apparent to those skilled in the art from this disclosure that there exists a need for an improved vehicle collision state detecting device. This invention addresses this need in the art as well as other needs, which will become apparent to those skilled in the art from this disclosure.

SUMMARY OF THE INVENTION

It has been discovered that in there exists a need for a vehicle collision state detecting device that detects the collision state of a vehicle. The above publications do not identify the type of collision. The object of the previously described existing technologies for detecting the state of a vehicle collision is to adjust the timing at which seatbelts, airbags, and other passenger restraining devices are triggered and thus obtain the maximum performance from the passenger restraining devices. However, in order to reduce the shock resulting from the vehicle collision state and ensure that the passengers are reliably restrained, it is necessary to improve the accuracy with which the collision state is detected and to improve the performance with which the passengers are restrained.

In view of the above, a vehicle collision state detecting device in accordance with the present invention is provided that basically comprises a front vehicle structural section, a tension member, left and right tensile force sensors and a collision state identifying section. The front vehicle structural section has a predetermined collision collapsing characteristic. The tension member has a prescribed initial tensile force extending in a width-wise direction of the front vehicle structural section. The left and right tensile force sensors are arranged on the front vehicle structural section to measure left and right tensile forces of the tension member. The collision state identifying section is configured to identify a collision state of the vehicle based on a comparison between the left and right tensile forces of the tension member measured by the left and right tensile force sensors.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

These embodiments are vehicle collision state detecting devices configured to detect the collision state of a vehicle with respect to certain prescribed moving bodies. With these vehicle collision state detecting devices, the tensile force in a tension member changes when the colliding object contacts the bumper reinforcement at the beginning of a collision. The tensile force in the tension member is measured by the tensile force sensors connected at both ends of the wire and the collision state is determined based on the measurement data obtained from the tensile force sensors. As a result, a wide range of collision states can be identified.

First Embodiment

Figure 1A:
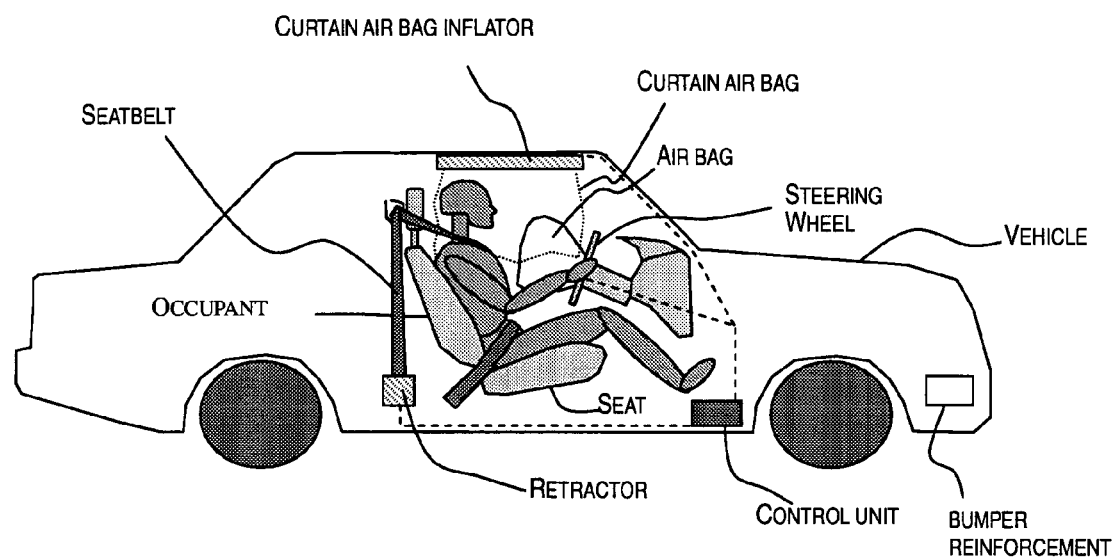
FIG. 1(A) is a diagrammatic side elevational view of a vehicle that has been equipped with a vehicle collision state detect device in accordance with a first embodiment of the present invention.
Figure 1B:
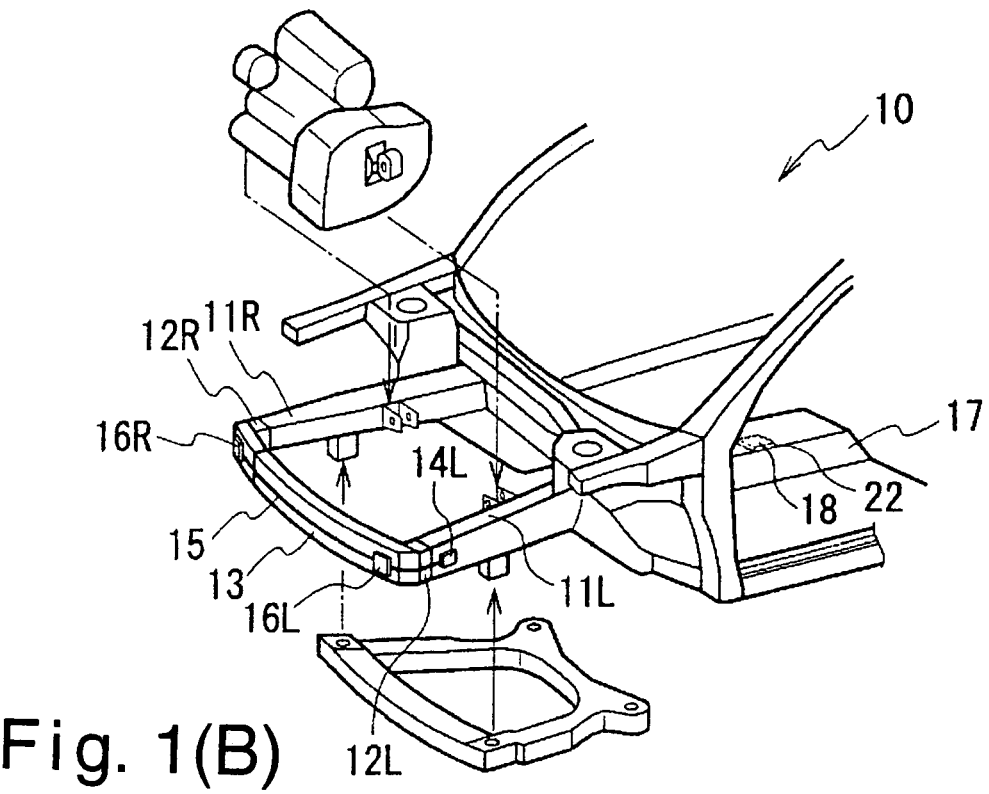
FIG. 1(B) is a diagrammatic perspective view of a front frame section of the vehicle of FIG. 1(A) that has been equipped with the vehicle collision state detecting device in accordance with the first embodiment.
Figure 1C:
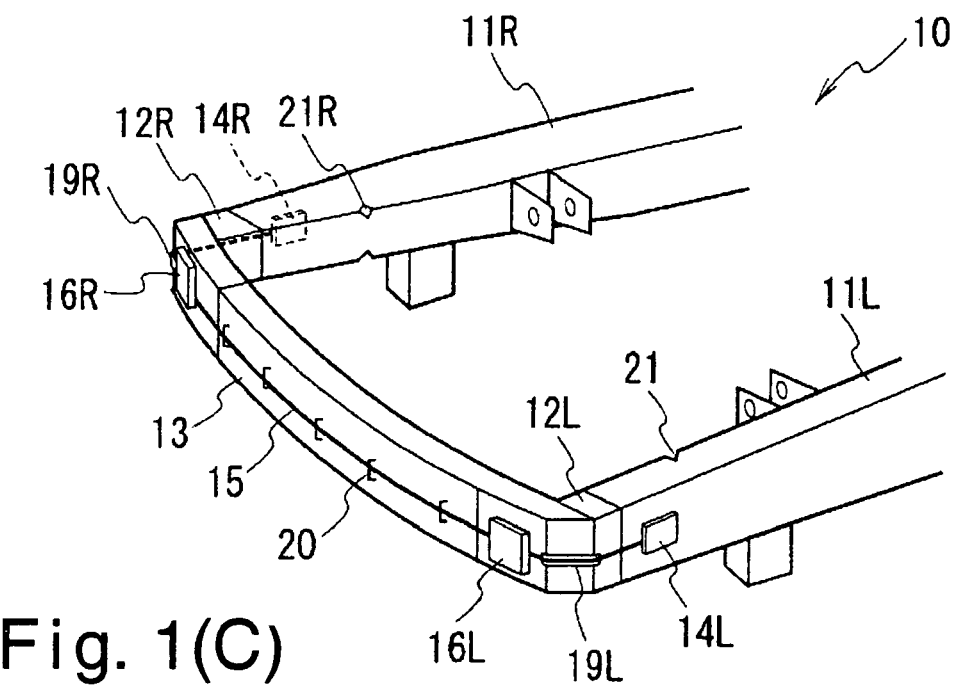
FIG. 1(C) is an enlarged partial perspective view showing selected details of a portion of the front frame section of the vehicle illustrated in FIG. 1(B) in accordance with the first embodiment.

Referring initially to FIG. 1(A), a front section of a vehicle is illustrated that is configured and arranged with a vehicle collision state detecting device 10 in accordance with a first embodiment of the present invention. In particular, the front section includes the main elements of the vehicle collision state detecting device 10 in accordance with the first embodiment. FIG. 1(B) shows the entire front section of the vehicle that forms a part of the vehicle collision state detecting device 10, while FIG. 1(C) is a detailed enlargement of the front section showing the details of a selected portion of the front section of the vehicle.

The vehicle collision state detecting device 10 basically includes a right side structural member 11R, a left side structural member 11L, a right bumper stay 12R, a left bumper stay 12L, a bumper reinforcement 13, a right tensile force sensor 14R, a left tensile force sensor 14L, a tension member or wire 15, a right lock mechanism 16R and a left lock mechanism 16L.

The side structural members 11R and 11L are arranged and configured on the left and right sides of the front section of the vehicle so that they are paced laterally apart and extend in a substantially longitudinal direction of the vehicle. The bumper stays 12R and 12L are easily deformable members, which are arranged on the forward tip ends of the side members 11R and 11L, respectively. The bumper reinforcement 13 is arranged crosswise in the widthwise direction of the vehicle with its end portions fixedly coupled the front end parts of the bumper stays 12R and 12L, respectively. The right and left tensile force sensors 14R and 14L are arranged on the outside of the approximate tip ends of the side structural members 11R and 11L, respectively. The tensile force sensors 14R and 14L serve to measure the tensile force. The wire 15 is fixedly connected between the right tensile force sensor 14R and the left tensile force sensor 14L and arranged to extend along the forward facing surface of the bumper reinforcement 13 between the side members 11R and 11L. The wire 15 is placed under tension to have a prescribed initial tensile force. The right and left lock mechanisms 16R and 16L are arranged on the bumper reinforcement 13 in the general vicinity of the front ends of the bumper stays 12R and 12L, respectively. The lock mechanisms 16R and 16L are configured to grip the wire 15 so as to divide and fix the wire 15 into individual sections when a collision occurs.

As shown in FIG. 1(B), the vehicle collision state detecting device 10 includes a floor tunnel 17 and a floor sensor 18, which is arranged on the floor tunnel 17 and functions as a deceleration sensor to measure the deceleration of the vehicle. As shown in FIG. 1(C), the vehicle collision state detecting device 10 also includes a pair of corner guides 19R and 19L and a plurality of front guides 20. The two corner guides 19R and 19L are arranged on the corner parts where the bumper stays 12R and 12L are connected to the bumper reinforcement 13. The corner guides 19R and 19L serve to prevent excess friction force from acting on the wire 15 at the corner part of the bumper reinforcement 13. The front guides 20 are arranged on the front surface of the bumper reinforcement 13 and serve to support the wire 15, which passes therethrough.

The front section also has a pair of deformation areas (a pair of notches) 21R and 21L located on the side structural members 11R and 11L to control collapsing of the side structural members 11R and 11L during a collision affect those areas. The deformation areas 21R and 21L are configured to give the side structural members 11R and 11L such a rigidity balance that when a load acts on the tip of one or both of the side members 11R and 11L in the widthwise direction of the vehicle, such as during an oblique collision, the side member collapses inward to some degree at the front or rear of the right tensile force sensor 14R and/or the left tensile force sensor 14L while momentarily collapsing axially.

Preferably, a control unit box is provided for housing the floor sensor 18 and a control unit 22 (collision state identifying section) that serves to determine when to trigger the passenger restraining devices (described later) are configured in an integral manner.

Figure 2:
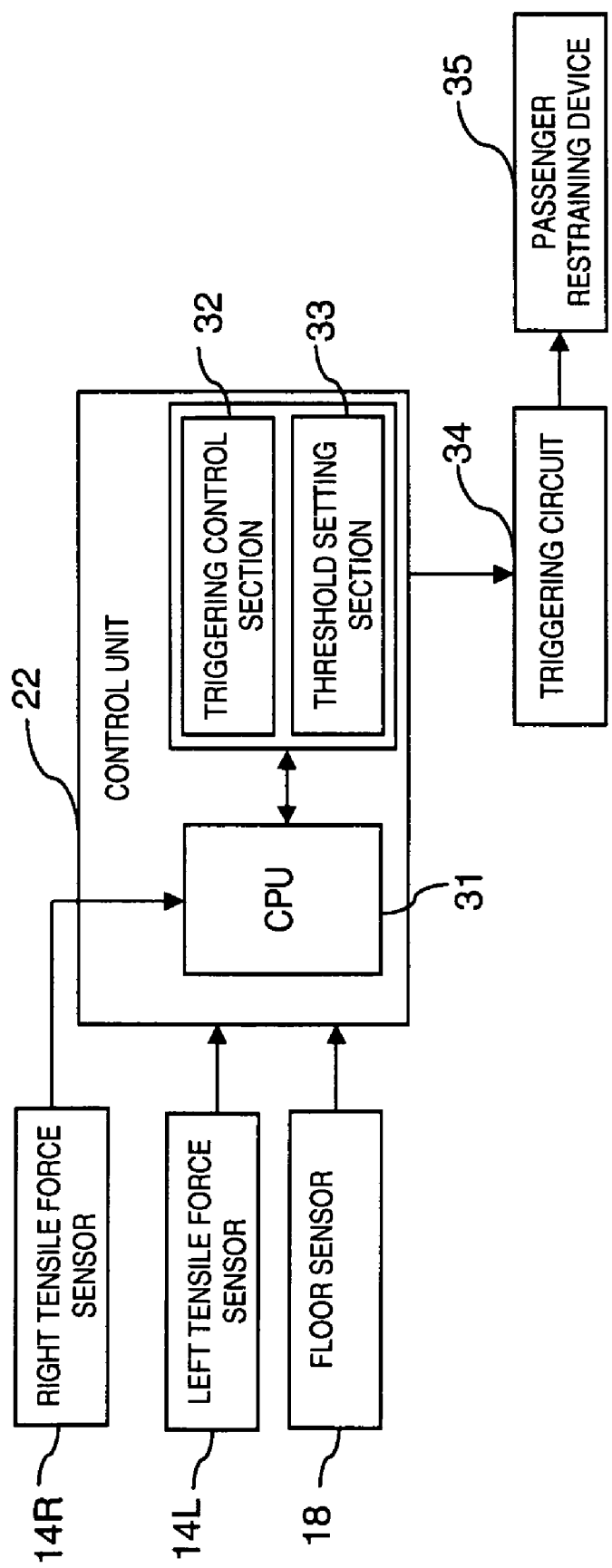
FIG. 2 is a block diagram showing a system configuration of the vehicle collision state detecting device in accordance with the first embodiment of the present invention.

As shown in the system block diagram of FIG. 2, the control unit 22 has a central processing unit or CPU 31, a triggering control section 32 that controls triggering of the passenger retraining devices 35, and a threshold value setting section 33 that sets a threshold value for triggering the passenger restraining devices 35. The control unit 22 preferably includes a microcomputer as the CPU 31 which runs a control program that controls the deployment of the passenger restraining devices as discussed below. The control unit 22 can also include other conventional components such as an input interface circuit, an output interface circuit, and storage devices such as a ROM (Read Only Memory) device and a RAM (Random Access Memory) device. The memory circuit stores processing results and control programs for the operations that are run by the processor circuit. The internal RAM of the control unit 22 stores statuses of operational flags and various control data. It will be apparent to those skilled in the art from this disclosure that the precise structure and algorithms for the control unit 22 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The vehicle collision state detecting device 10 is configured such that the tensile force in the wire 15 measured by the right tensile force sensor 14R and left tensile force sensor 14L (which are arranged on the outside of the approximate tip ends of the side members 11R and 11L, respectively) and the deceleration measured by the floor sensor 18 (which is arranged on the floor tunnel 17) are fed to the control unit 22. Controlled by the CPU 31 of the control unit 22, the vehicle collision state detecting device 10 identifies the collision state based on the balance between the left and right tensile forces of the wire 15 measured by the right tensile force sensor 14R and the left tensile force sensor 14L. Based on the identified collision state, the triggering control section 32 executes calculations for executing triggering control of the passenger restraining devices 35 (e.g., seatbelts and airbags), the threshold value setting section 33 calculates and sets a threshold value for triggering the passenger restraining devices 35, and the passenger restraining devices 35 are controlled through a triggering circuit 34.

Structure of the Lock Mechanism

The structure of the right lock mechanism 16R and the left lock mechanism 16L (which divide and fix the wire 15 during a collision) will now be described using FIG. 3. The right and left lock mechanisms 16R and 16L are identical in the illustrated embodiment. For the sake of brevity, only the right lock mechanism 16R will be discussed and illustrated in detail herein.

Figure 3A:
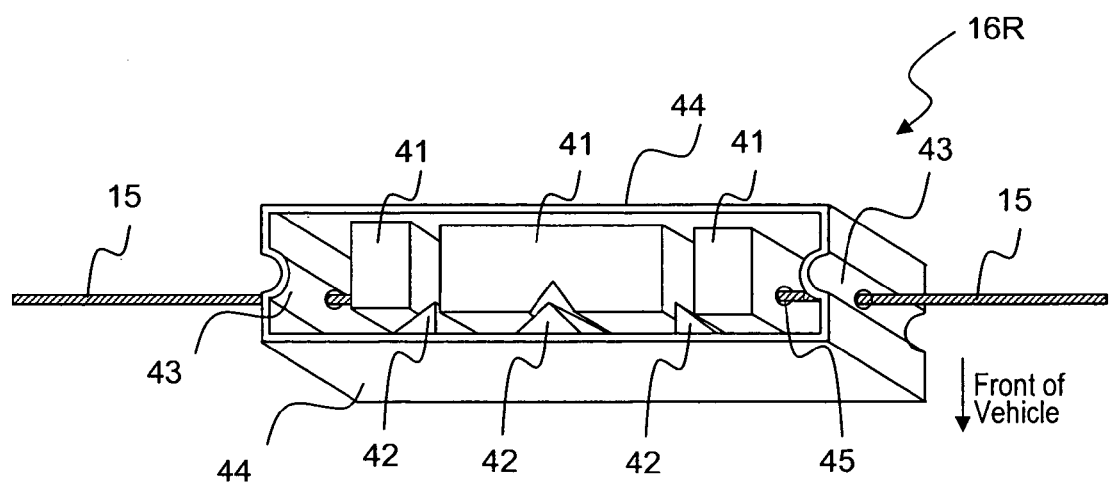
FIG. 3(A) is a diagrammatic perspective view of the lock mechanism the vehicle collision state detecting device in accordance with the first embodiment of the present invention.

As shown in the perspective view of FIG. 3(A), the lock mechanism 16R comprises a plurality of stopper parts 41 coupled to the wire 15 at spaced apart locations, a plurality of protruding parts 42 positioned such that they can fit into the stopper parts 41, and a pair of deformable end plates 43, and a pair of support plates 44 that are connected to the deformable end plates 43. The forward most one of the support plates 44 supports the protruding parts 42.

The stopper parts 41 are provided with bores 45 for connecting the wire 15 to the stopper parts 41. The wire 15 is fixedly connected to the stopper parts 41 of the lock mechanism 16 through the bores 45. The center stopper part 41 is also provided with a notch or groove for receiving one of the protruding parts 42 therein.

The protruding parts 42 are shaped to fit into the notches or grooves provided in the stopper parts 41 or the spaces therebetween. Thus, the protruding parts 42 are configured and arranged closer to the front of the vehicle than the stopper parts 41.

The support plates 44 are longer than the stopper parts 41 and the protruding parts 42 in the widthwise direction of the vehicle. Also, two deformation structures (notches) are provided in the deformable end plates 43. The protruding parts 42 are supported for movement upon deformation of the deformable end plates 43.

Figure 3B:
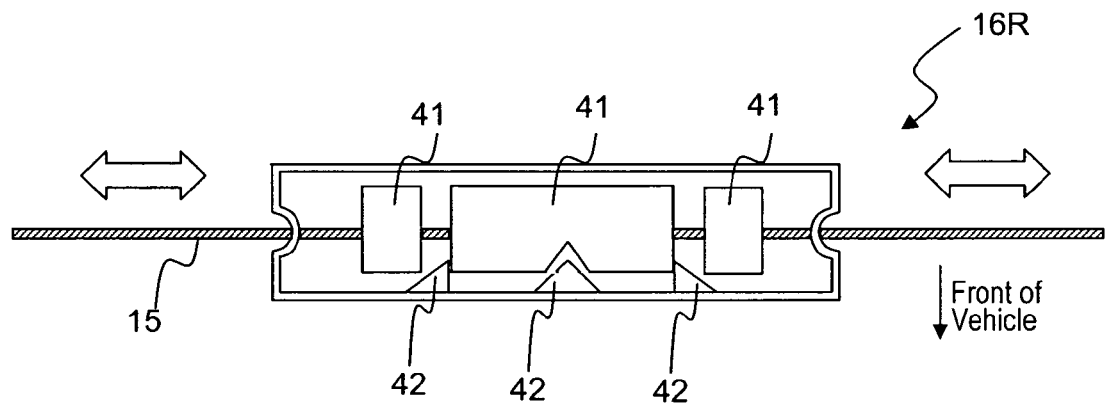
FIG. 3(B) is a top plan view of the lock mechanism the vehicle collision state detecting device that illustrates the operation of the lock mechanism prior to a frontal collision.

In a lock mechanism 16R so constituted, a prescribed clearance exists between the protruding parts 42 and the stopper parts 41 when a collision is not occurring, as shown in FIG. 3(B). As a result, the wire 15 can move freely in the widthwise direction of the vehicle relative to the stopper parts 41. Thus, the lock mechanism 16 allows equal tensile forces to exist in the left and right portions of the wire 15 extending from the stopper parts 41.

Figure 3C:
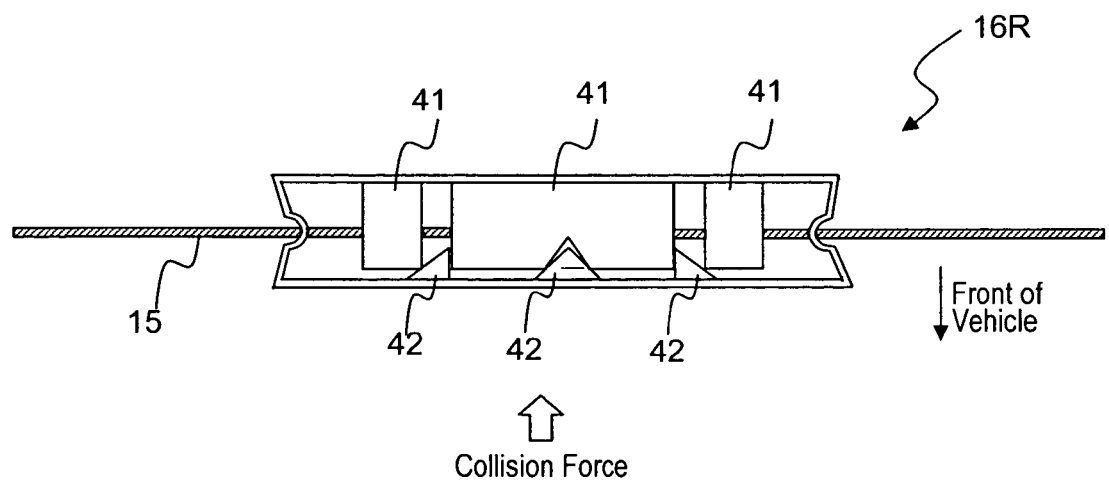
FIG. 3(C) is a top plan view of the lock mechanism the vehicle collision state detecting device that illustrates the operation of the lock mechanism after a frontal collision.

When a collision occurs, the support plates 43 of the lock mechanism 16 buckle due to the contact of the colliding object against the protruding parts 42, as shown in FIG. 3(C). The protruding parts 42 fit into the notches or grooves provided in the stopper parts 41 to deflect stopper parts 41 against the wire 15 so as to grip the wire 15. Thus, movement of the stopper parts 41 in the widthwise direction of the vehicle is restrained. As a result, the wire 15 can no longer move in the widthwise direction of the vehicle and the lock mechanism 16 causes independent tensile forces to exist in the left and right portions of the wire 15 extending from the stopper parts 41.

By operating as described below, a vehicle collision state detecting device 10 equipped with such a lock mechanism 16 can identify various vehicle collision states or types.

Operation of the Vehicle Collision State Detecting Device

The operation of the previously described vehicle collision state detecting device will now be explained. In particular, the method of identifying the vehicle collision state based on the balance between the tensile forces on the left and right of the vehicle will now be explained.

Identification of Front Collision

Figure 4A:
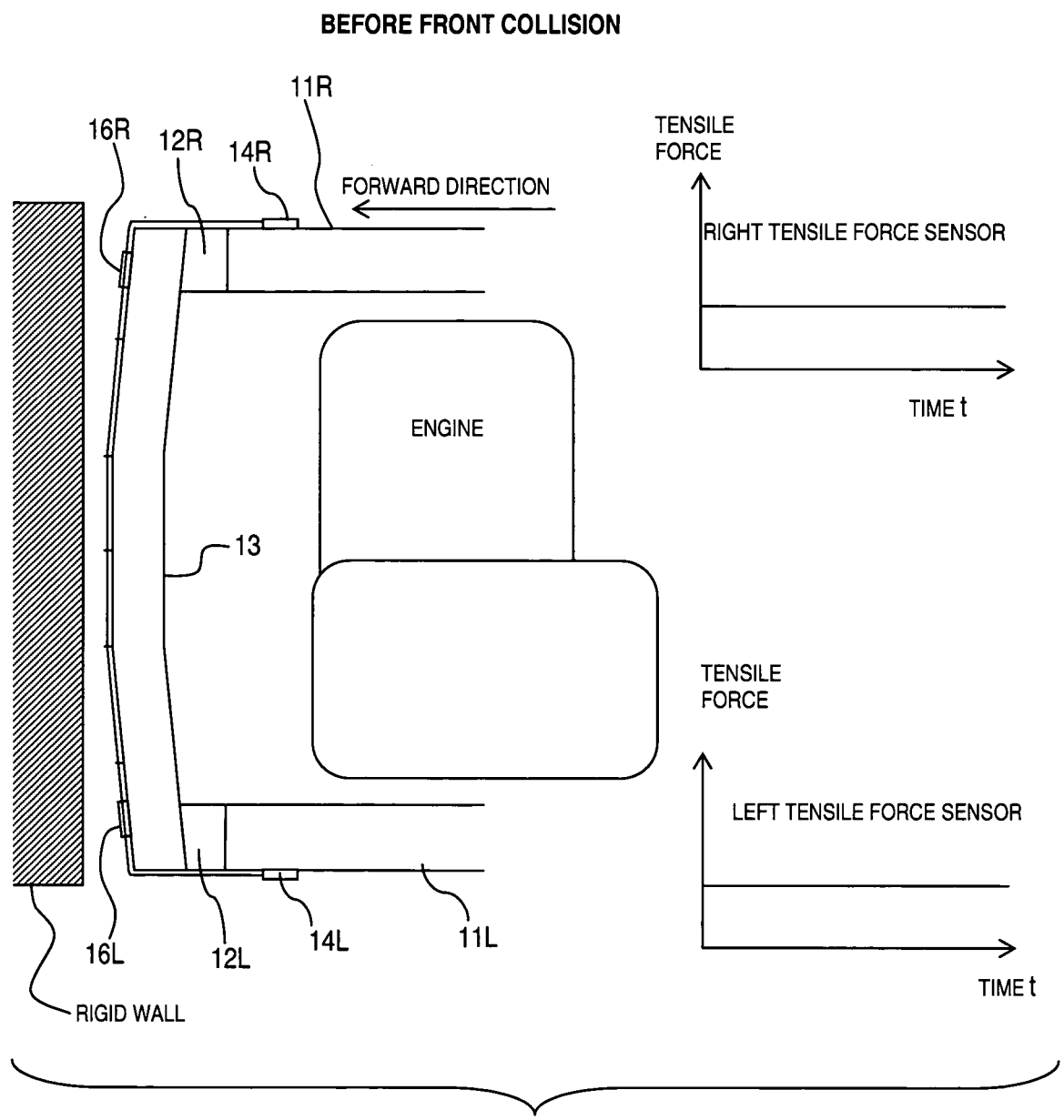
FIG. 4(A) is a diagrammatic top plan views of the front frame section of the vehicle and a pair of plots showing the tensile forces that are measured in the wire by the left and right tensile force sensors during the period just prior to a front collision.
Figure 4B:
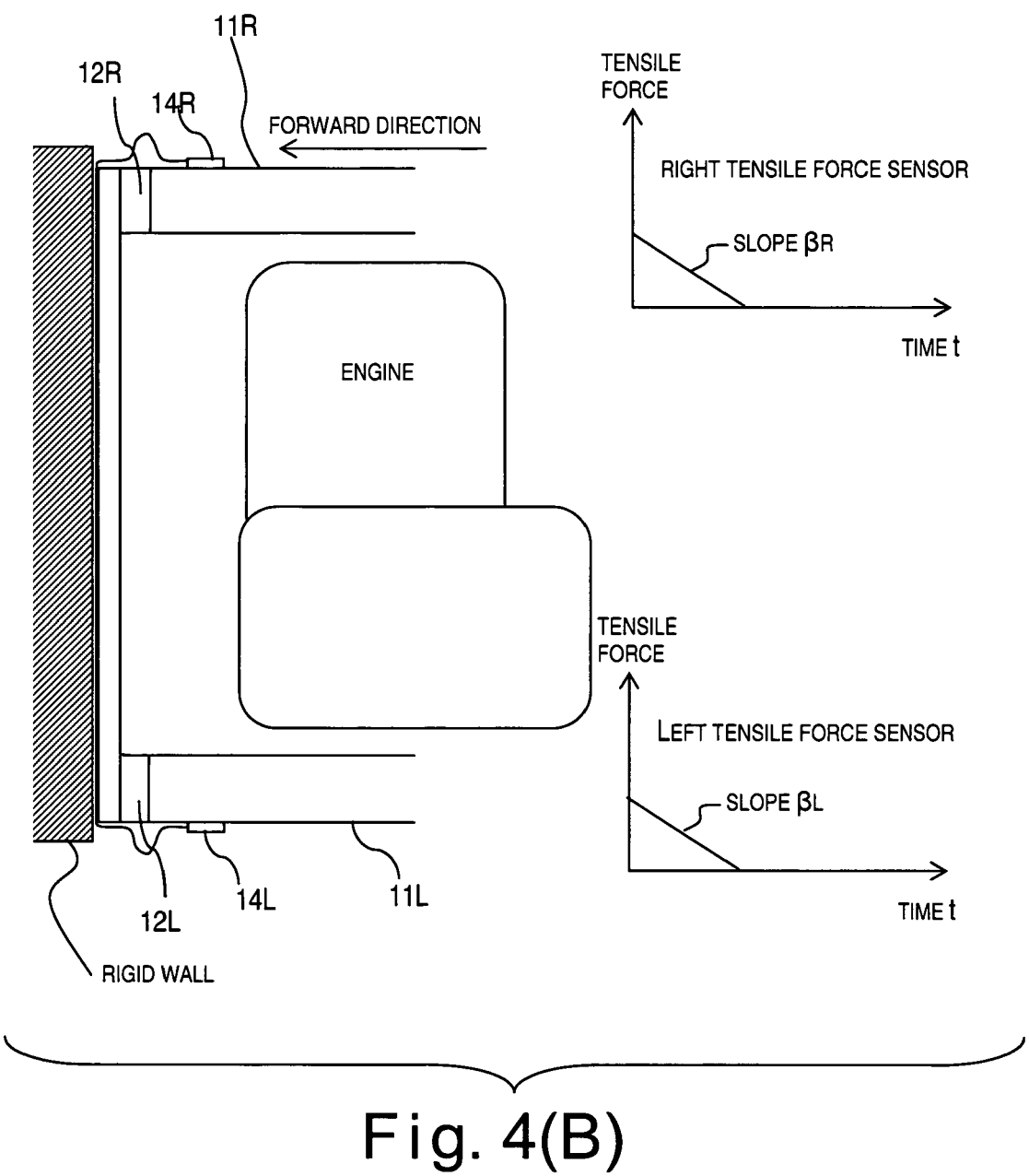
FIG. 4(B) is a diagrammatic top plan views of the front frame section of the vehicle and a pair of plots showing the tensile forces that are measured in the wire by the left and right tensile force sensors for a front collision at a collision speed of 15 km/h.
Figure 4C:
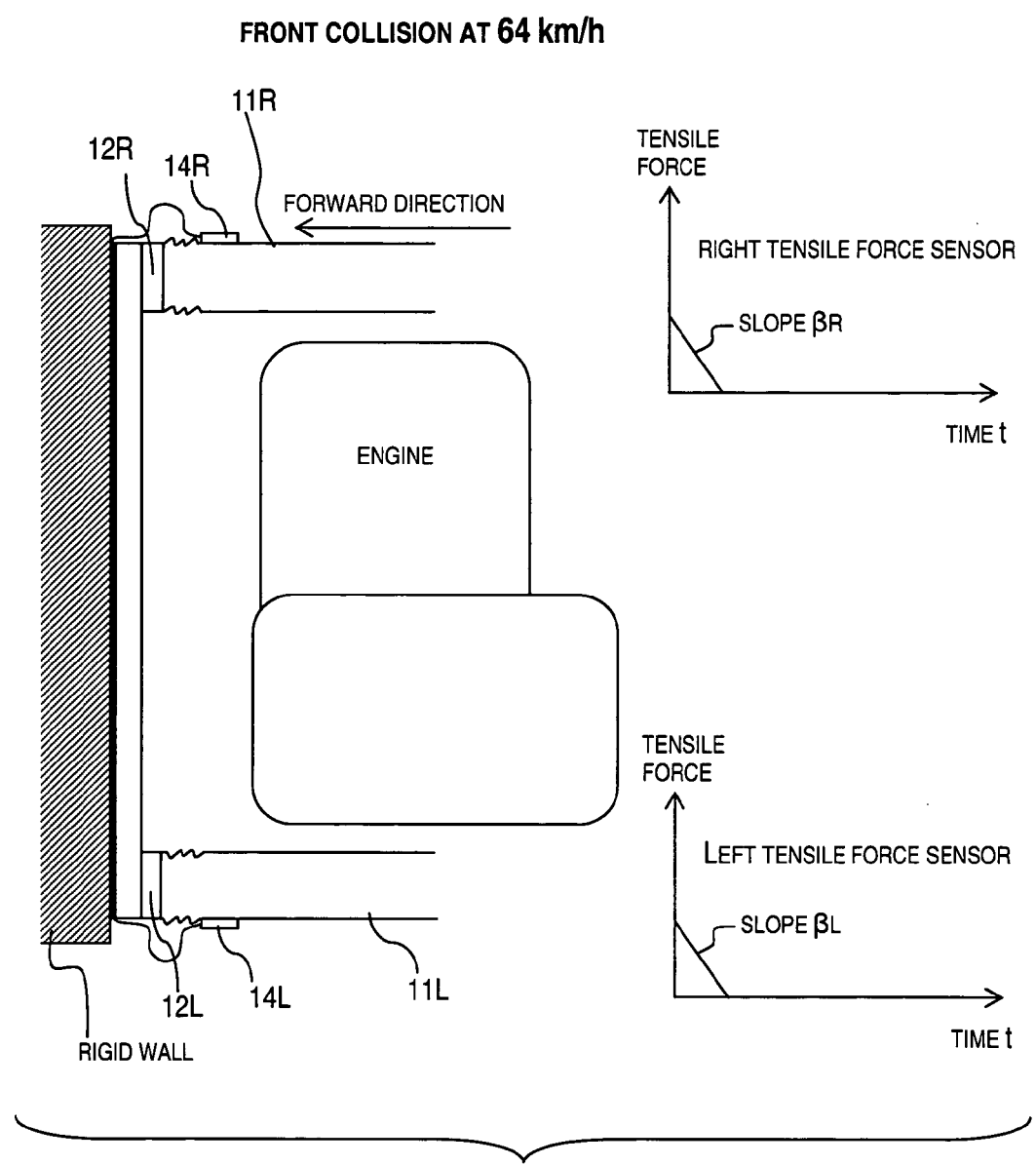
FIG. 4(C) is a diagrammatic top plan views of the front frame section of the vehicle and a pair of plots showing the tensile forces that are measured in the wire by the left and right tensile force sensors for a front collision at a collision speed of 64 km/h.

Referring to FIGS. 4(A)–4(C), plots of the tensile forces are illustrated that show the tensile forces measured in the wire 15 during a front collision with a rigid wall. The plots show the tensile forces measured by the right tensile force sensor 14R and the left tensile force sensor 14L during the period from the beginning of the collision to the end of the collision. In particular, FIG. 4(A) shows plots of the tensile forces before the front collision. FIG. 4(B) shows plots of the tensile forces for a 15-km/h collision speed, while FIG. 4(C) shows plots of the tensile forces for a 64-km/h collision speed.

Since the wire 15 of the vehicle collision state detecting device 10 is tensioned to a prescribed initial tensile force, the tensile force measured by the right tensile force sensor 14R and the tensile force measured by the left tensile force sensor 14L are substantially constant and equal during normal travel before the front collision, as shown in FIG. 4(A).

When a front collision occurs at a collision speed of 15 km/h, the right lock mechanism 16R and the left lock mechanism 16L provided on the surface of the bumper reinforcement 13 both utilize the collision load to fix the wire 15 simultaneously. Afterwards, the bumper reinforcement 13 deforms and the right and left bumper stays 12R and 12L simultaneously collapse due to collision pressure.

Since the bumper stays 12R and 12L collapse substantially simultaneously, the tensile forces measured by the right tensile force sensor 14R and the left tensile force sensor 14L provided on the side members 11R and 11L decrease from the initial tensile force substantially simultaneously at slopes $\beta_R$ and $\beta_L$, as shown in FIG. 4(B).

When a front collision occurs at a collision speed of 64 km/h, the collapsing pressure level is higher than in the case of the 15-km/h collision, but the collision state is substantially the same. The tensile forces measured by the right tensile force sensor 14R and the left tensile force sensor 14L provided on the side members 11R and 11L decrease from the initial tensile force substantially simultaneously, as shown in FIG. 4(C). The absolute values of the slopes (i.e., time rates) $\beta_R$ and $\beta_L$ at which the tensile forces decrease from the initial tensile force are larger for the 64-km/h collision than for the 15-km/h collision.

During a front collision, the tensile forces measured by the right tensile force sensor 14R and the left tensile force sensor 14L provided on the side members 11R and 11L decrease substantially simultaneously. Therefore, when the tensile forces measured by the right tensile force sensor 14R and the left tensile force sensor 14L provided on the side members 11R and 11L decrease substantially simultaneously, the control unit 22 identifies the collision state as a front collision.

Identification of Simple Offset Collision

Figure 5A:
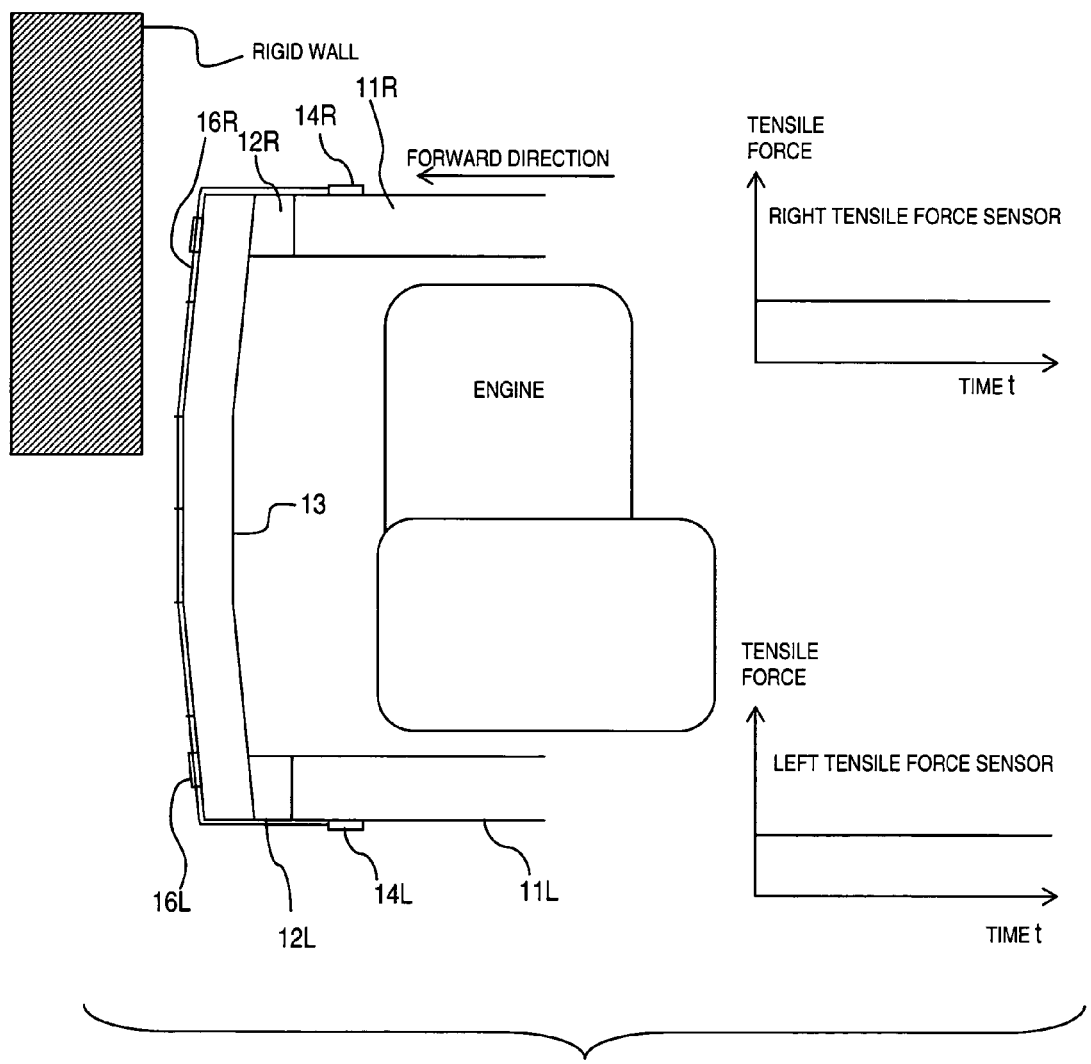
FIG. 5(A) shows plots of the tensile forces before the simple offset collision.
Figure 5B:
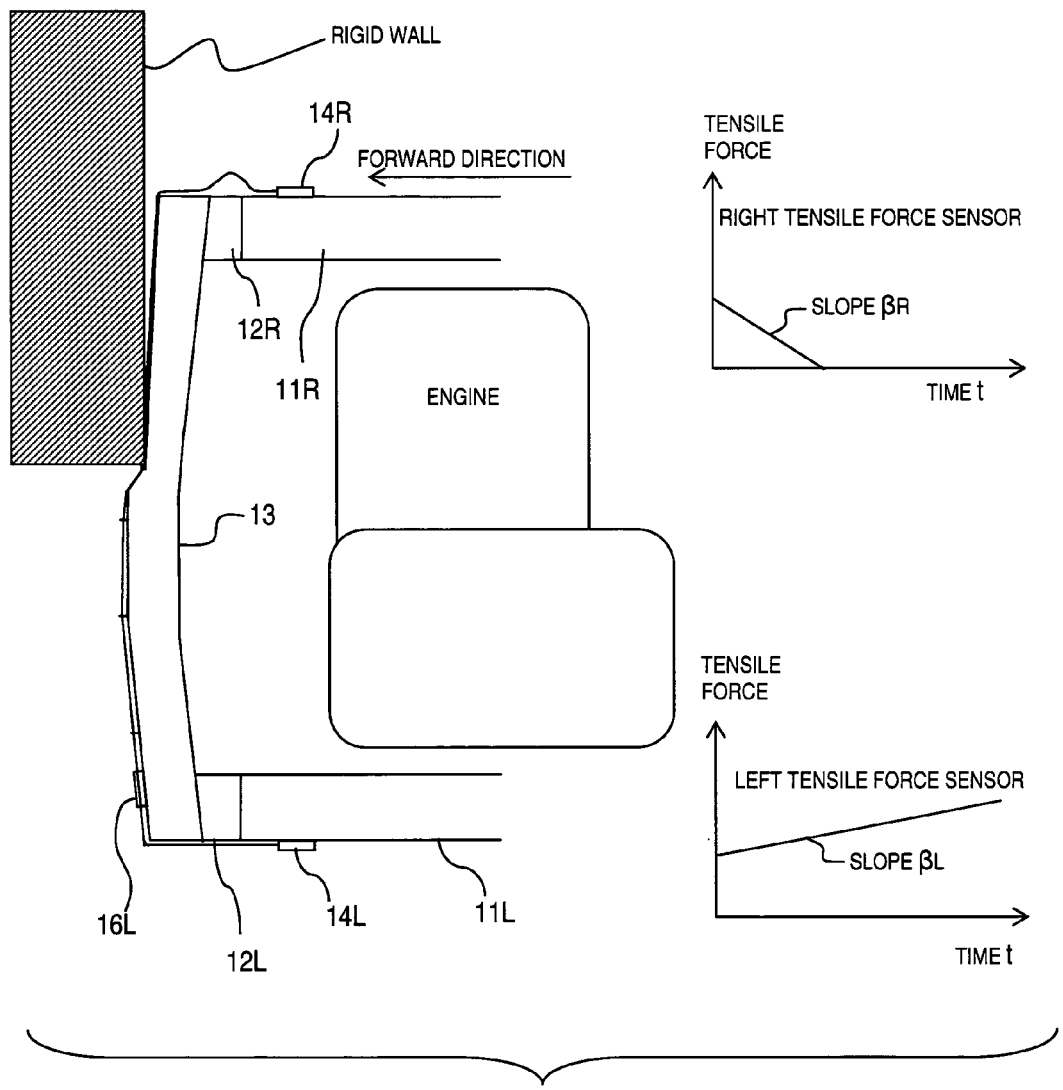
FIG. 5(B) shows plots of the tensile forces for a simple offset collision at a collision speed of 15 km/h.
Figure 5C:
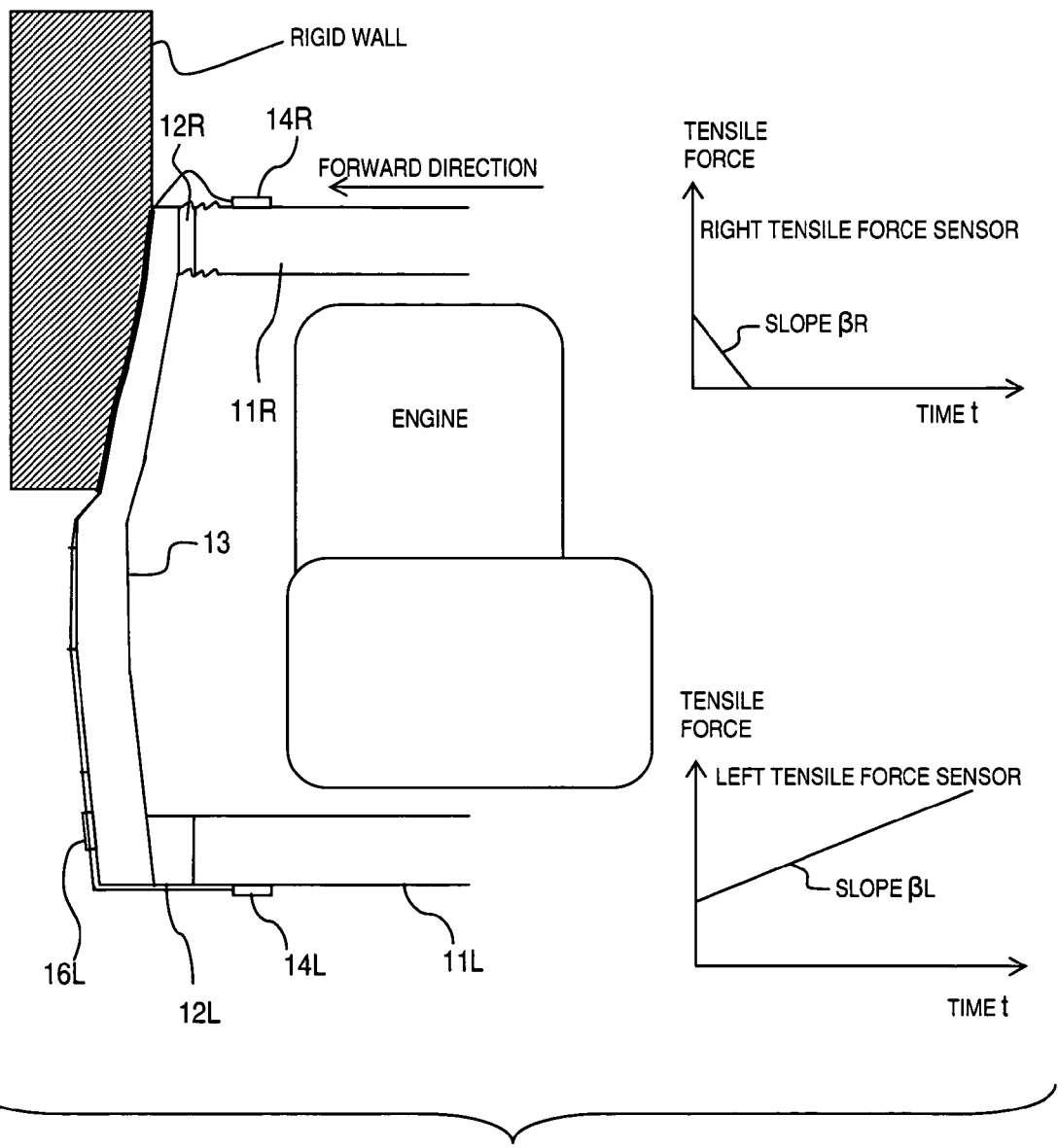
FIG. 5(C) shows plots of the tensile forces for a simple offset collision at a collision speed of 64 km/h.

Referring now to FIGS. 5(A)–5(C), plots of the tensile forces are illustrated that show the tensile forces measured in the wire 15 during a simple offset collision with a rigid wall. The plots show the tensile forces measured by the right tensile force sensor 14R and the left tensile force sensor 14L during the period from the beginning of the collision to the end of the collision. FIG. 5(A) shows plots of the tensile forces before the simple offset collision. FIG. 5(B) shows plots of the tensile forces for a 15-km/h collision speed, while FIG. 5(C) shows plots of the tensile forces for a 64-km/h collision speed.

Since the wire 15 of the vehicle collision state detecting device 10 is tensioned to a prescribed initial tensile force, the tensile force measured by the right tensile force sensor 14R and the tensile force measured by the left tensile force sensor 14L are substantially constant during normal travel before the simple offset collision, as shown in FIG. 5(A).

When a simple offset collision occurs at a collision speed of 15 km/h, one of the lock mechanisms 16R and 16L provided on the surface of the bumper reinforcement 13 utilizes the collision load to fix the wire 15. More specifically, as shown in FIG. 5(B), the right lock mechanism 16R fixes the wire 15 when the collision occurs on the right side of the vehicle. Afterwards, the bumper reinforcement 13 deforms and the bumper stay on the side where the collision occurred, i.e., the bumper stay 12R in this example, collapses due to the collision pressure.

Due to the collapse of the bumper stay 12R and the fixing of the wire 15 by the right lock mechanism 16R, the tensile force measured by the tensile force sensor provided on the side member on the side where the collision occurred, i.e., the right tensile force sensor 14R, decreases from the initial tensile force at slope $\beta_R$ as shown in FIG. 5(B).

Meanwhile, the tensile force measured by the tensile force sensor provided on the side member on the side where the collision did not occur, i.e., the left tensile force sensor 14L, increases from the initial tensile force at slope $\beta_L$ as shown in FIG. 5(B). This occurs because the right lock mechanism 16R moves toward the rear of the vehicle due to the deformation of the bumper stay 12R while continuing to fix the wire 15 and the bumper stay and side member on the side where the collision did not occur, i.e., the bumper stay 12L and the side member 11L, do not readily deform. Thus, the wire 15 is pulled toward the side where the collision occurred.

When a simple offset collision occurs at a collision speed of 64 km/h, the pressure collapse level is higher than in the case of the 15-km/h collision but the collision state is substantially the same. As shown in FIG. 5(C), the tensile force measured by the tensile force sensor provided on the side member on the side where the collision occurred, i.e., the right tensile force sensor 14R, decreases from the initial tensile force and the tensile force measured by the tensile force sensor provided on the side member on the side where the collision did not occur, i.e., the left tensile force sensor 14L, increases from the initial tensile force. The absolute values of the slopes (i.e., time rates) $\beta_R$ and $\beta_L$ at which the tensile forces decrease or increase from the initial tensile force are larger for the 64-km/h collision than for the 15-km/h collision.

Thus, during a simple offset collision, the tensile force measured by the tensile force sensor provided on the side member on the side where the collision occurred decreases from the initial tensile force and the tensile force measured by the tensile force sensor provided on the side member on the side where the collision did not occur increases from the initial tensile force. Therefore, when the tensile forces measured by the right tensile force sensor 14R and the left tensile force sensor 14L provided on the side members 11R and 11L are such that one decreases while the other increases, the control unit 22 identifies the collision state as a simple offset collision on the side where the tensile force decreased.

Identification of Pole Collision

Figure 6A:
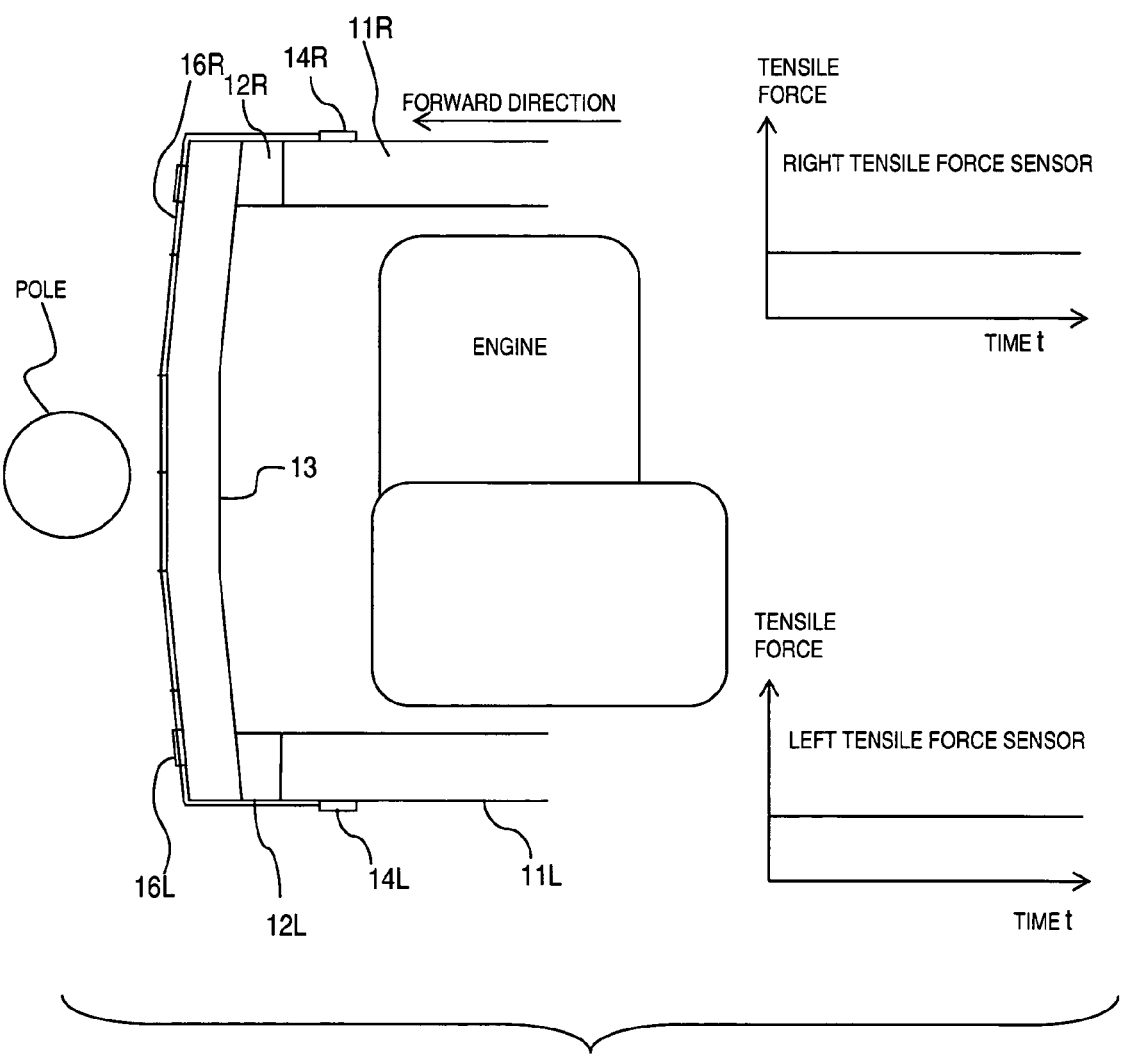
FIG. 6(A) shows plots of the tensile forces before the pole collision.
Figure 6B:
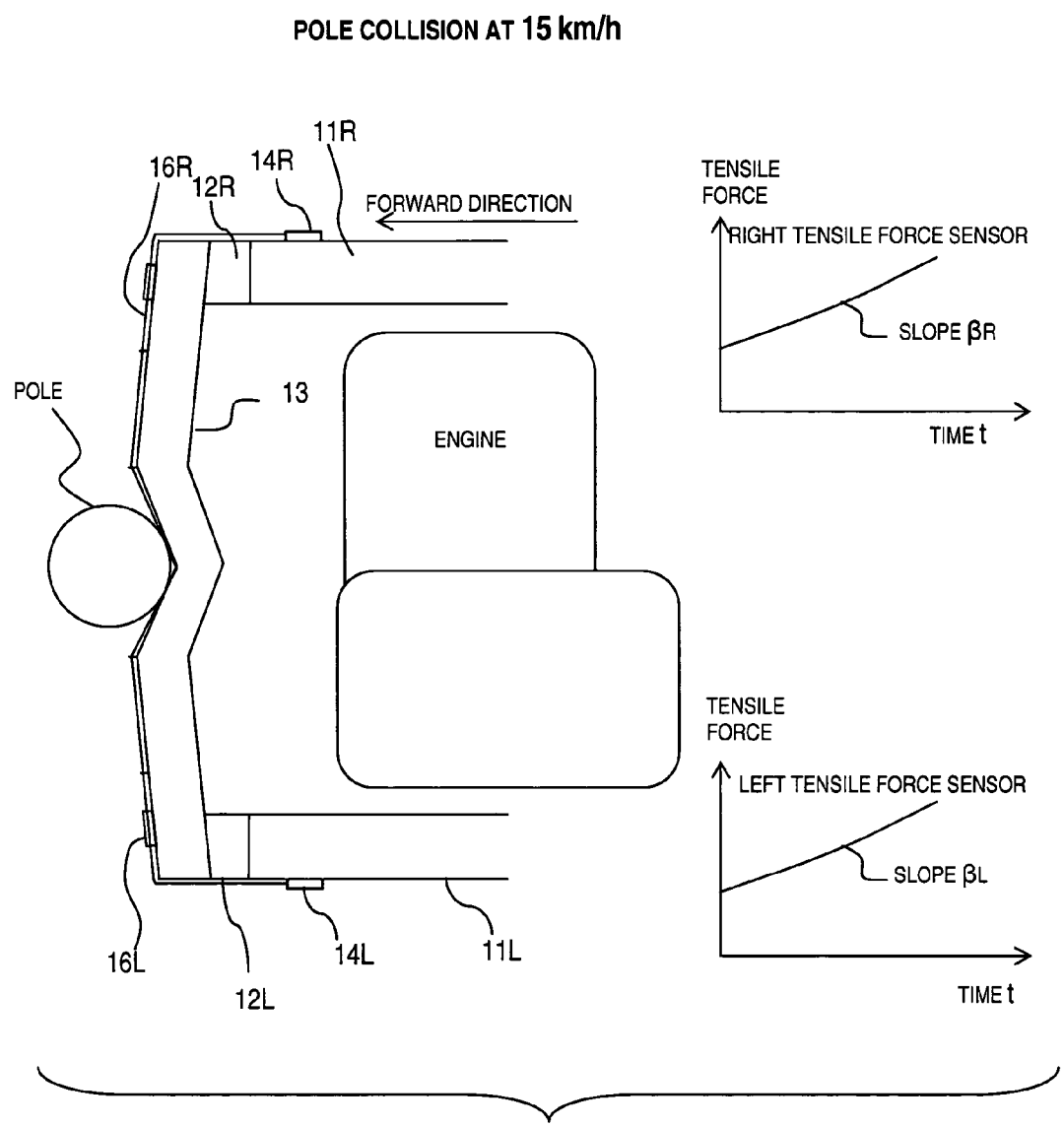
FIG. 6(B) shows plots of the tensile forces for a pole collision at a collision speed of 15 km/h.
Figure 6C:
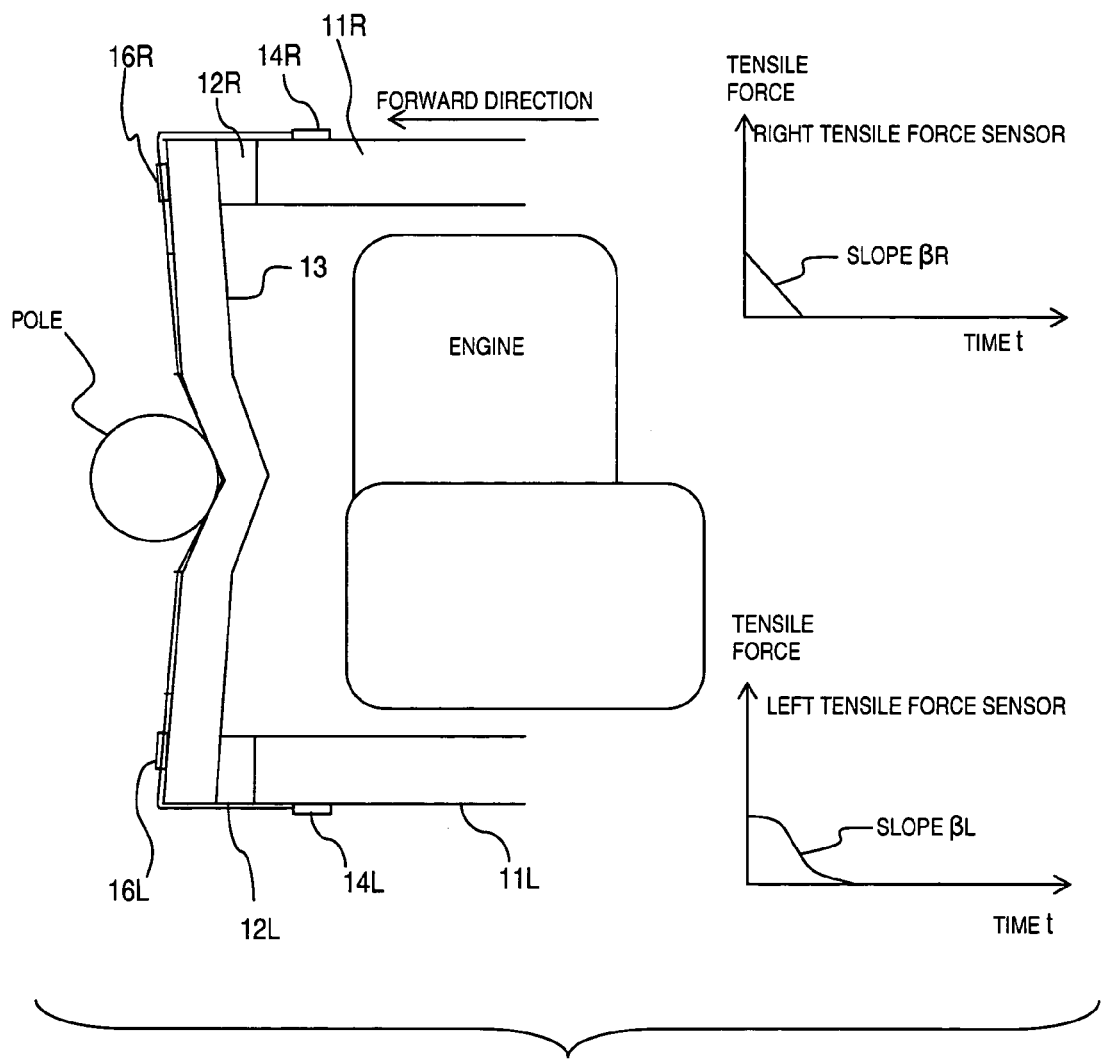
FIG. 6(C) shows plots of the tensile forces for a pole collision at a collision speed of 64 km/h.

Referring now to FIGS. 6(A)–6(C), plots of the tensile forces are illustrated that show the tensile forces measured in the wire 15 during a pole collision. The plots show the tensile forces measured by the right tensile force sensor 14R and the left tensile force sensor 14L during the period from the beginning of the collision to the end of the collision. FIG. 6(A) shows plots of the tensile forces before the pole collision. FIG. 6(B) shows plots of the tensile forces for a 15-km/h collision speed, while FIG. 6(C) shows plots of the tensile forces for a 64-km/h collision speed.

Since the wire 15 of the vehicle collision state detecting device 10 is tensioned to a prescribed initial tensile force, the tensile force measured by the right tensile force sensor 14R and the tensile force measured by the left tensile force sensor 14L are substantially constant during normal travel before the pole collision, as shown in FIG. 6(A).

As shown in FIG. 6(B), when a pole collision occurs at a collision speed of 15 km/h, first the pole collides with the bumper reinforcement 13 and moves toward the engine while deforming the bumper reinforcement 13.

Since the pole does not contact them, the right and left side members 11R and 11L do no readily deform and the wire 15 is pulled by the pole. Consequently, the tensile forces measured by the right tensile force sensor 14R and the left tensile force sensor 14L provided on the side members 11R and 11L both increase from the initial tensile force at slopes of $\beta_R$ and $\beta_L$, respectively, as shown in FIG. 6(B).

When a pole collision occurs at a collision speed of 64 km/h, the pressure collapse level is higher than in the case of the 15-km/h collision but the collision state is substantially the same. The tensile forces measured by the right tensile force sensor 14R and the left tensile force sensor 14L provided on the side members 11R and 11L increase from the initial tensile force as shown in FIG. 6(C). The absolute values of the slopes (i.e., time rates) $\beta_R$ and $\beta_L$ at which the tensile forces decrease from the initial tensile force are larger for the 64-km/h collision than for the 15-km/h collision.

During a pole collision, the tensile forces measured by the right tensile force sensor 14R and the left tensile force sensor 14L provided on the side members 11R and 11L both increase. Therefore, when the tensile forces measured by the right tensile force sensor 14R and the left tensile force sensor 14L provided on the side members 11R and 11L both increase, the control unit 22 identifies the collision state as a pole collision.

Identification of Oblique Offset Collision

Figure 7A:
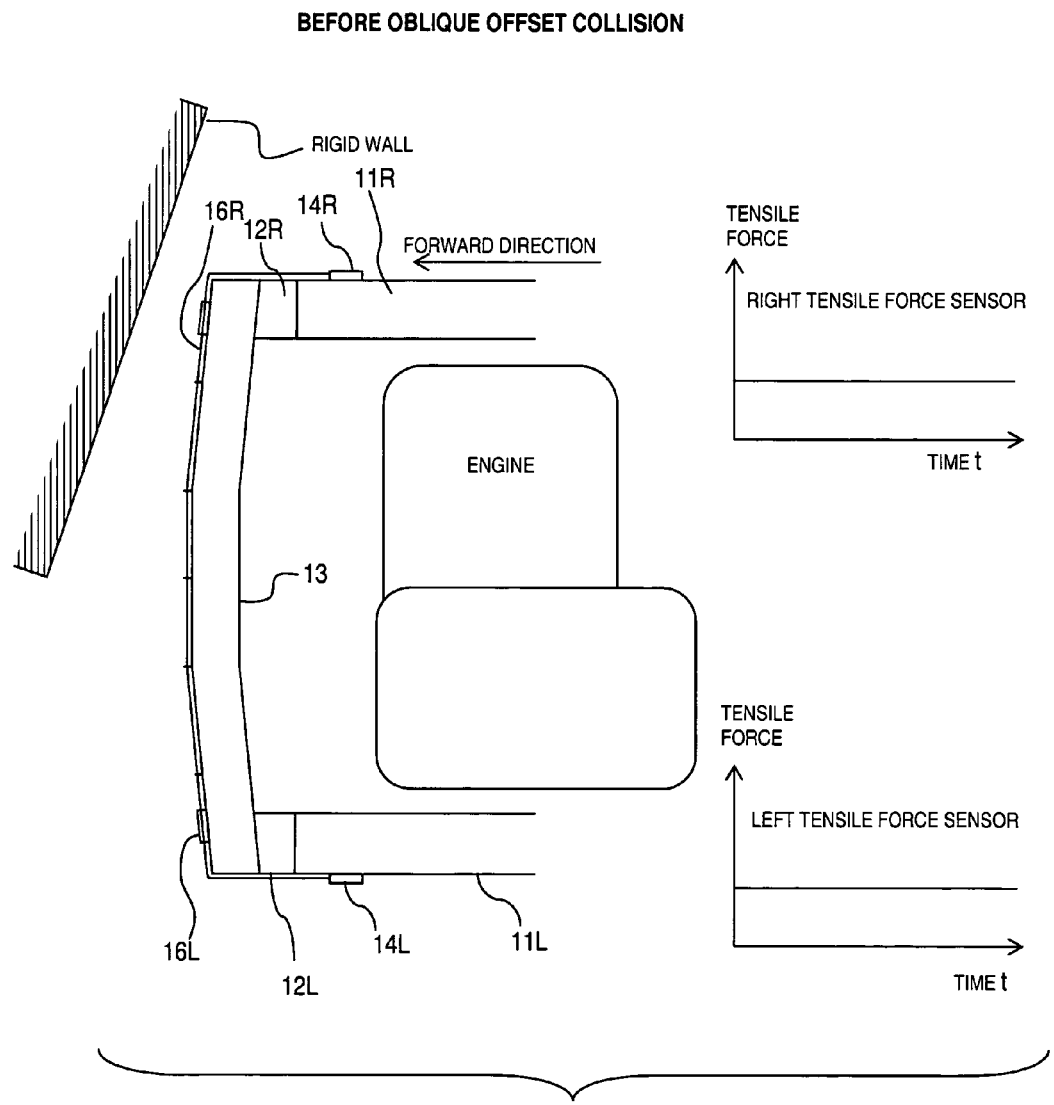
FIG. 7(A) shows plots of the tensile forces before the oblique offset collision.
Figure 7B:
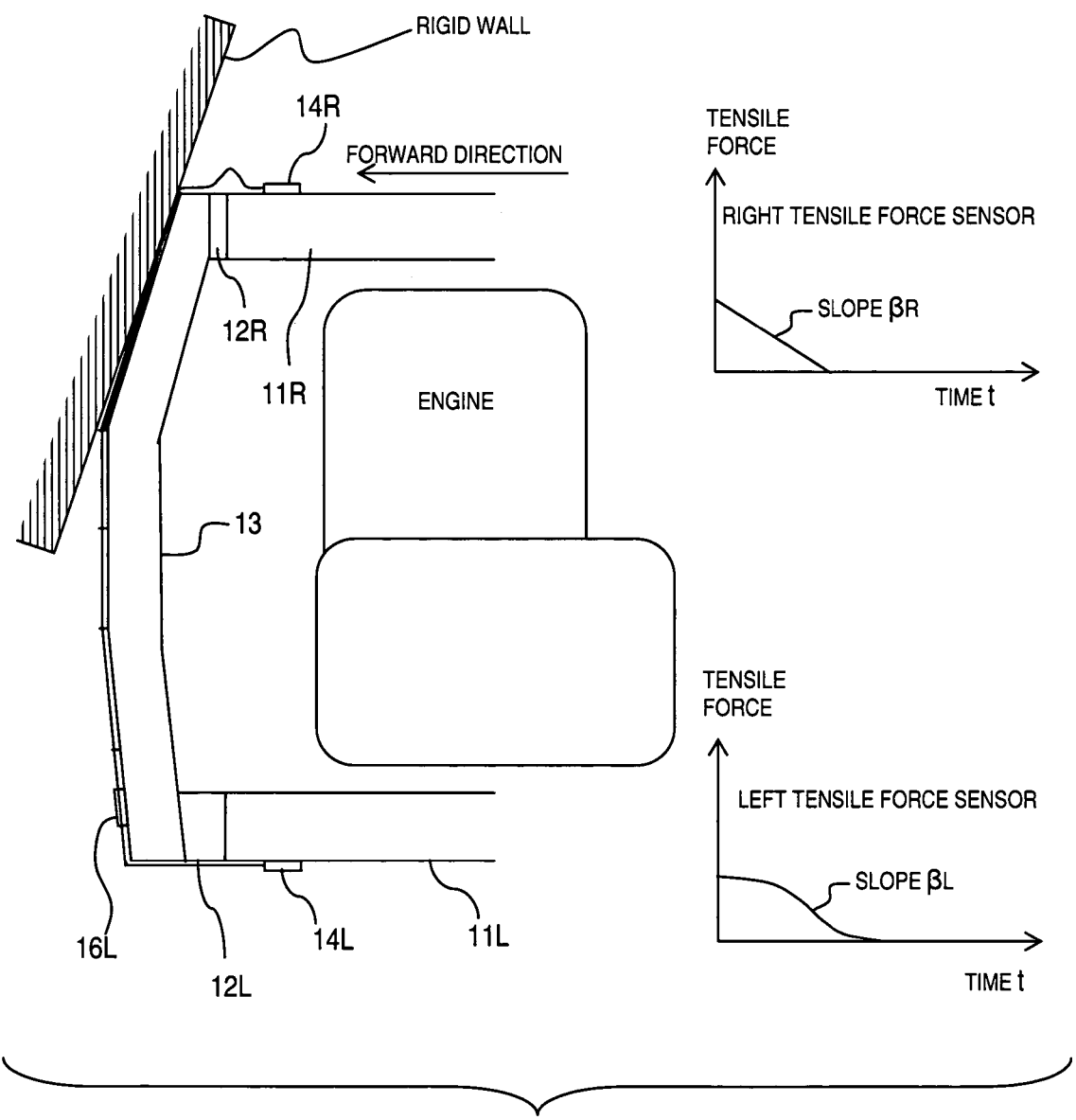
FIG. 7(B) shows plots of the tensile forces for an oblique offset at a collision speed of 15 km/h.
Figure 7C:
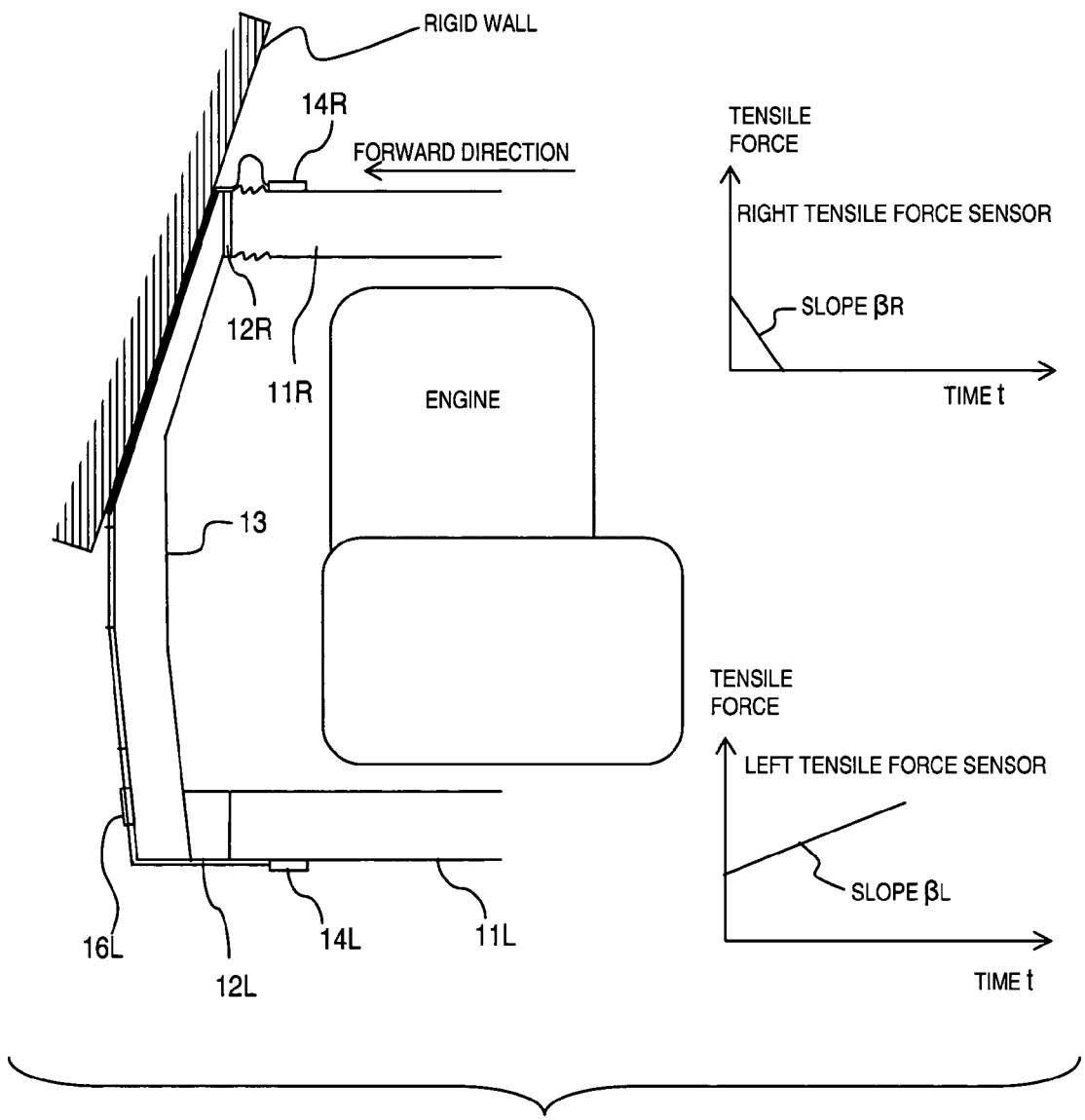
FIG. 7(C) shows plots of the tensile forces for an oblique offset collision at a collision speed of 64 km/h.

Referring now to FIGS. 7(A)–7(C), plots of the tensile forces are illustrated that show the tensile forces measured in the wire 15 during an oblique offset collision. The plots show the tensile forces measured by the right tensile force sensor 14R and the left tensile force sensor 14L during the period from the beginning of the collision to the end of the collision.

FIG. 7(A) shows plots of the tensile forces before the oblique offset collision. FIG. 7(B) shows plots of the tensile forces for a 15-km/h collision speed, while FIG. 7(C) shows plots of the tensile forces for a 64-km/h collision speed.

Since the wire 15 of the vehicle collision state detecting device 10 is tensioned to a prescribed initial tensile force, the tensile force measured by the right tensile force sensor 14R and the tensile force measured by the left tensile force sensor 14L are substantially constant during normal travel before the oblique offset collision, as shown in FIG. 7(A).

When an oblique offset collision occurs at a collision speed of 15 km/h, a lock mechanism provided on the surface of the bumper reinforcement 13 utilizes the collision load to fix the wire 15. More specifically, as shown in FIG. 7(B), the right lock mechanism 16R fixes the wire 15 when the collision occurs on the right side of the vehicle. Afterwards, the bumper reinforcement 13 deforms and the bumper stay on the side where the collision occurred, i.e., the bumper stay 12R in this example, collapses due to the collision pressure. Also, since a load is imparted in the widthwise direction of the vehicle, the bumper stay and the tip of the side member on the side where the collision occurred, i.e., the bumper stay 12R and the tip of the side member 11R in this example, collapse inward.

Due to the collapse of the bumper stay 12R and the fixing of the wire 15 by the right lock mechanism 16R, the tensile force measured by the tensile force sensor provided on the side member on the side where the collision occurred, i.e., the right tensile force sensor 14R, decreases from the initial tensile force at slope $\beta_R$ as shown in FIG. 7(B).

Meanwhile, the tensile force measured by the tensile force sensor provided on the side member on the side where the collision did not occur, i.e., the left tensile force sensor 14L, decreases from the initial tensile force at a slope $\beta_L$ that is proportional to the speed at which the bumper stay 12R and the side member 11R collapse inward and more gradual than the slope $\beta_R$, as shown in FIG. 7(B). This occurs because, while the wire 15 is fixed by the right lock mechanism, the portion the side member 11R with the right lock mechanism 16R moves toward the inside of the vehicle due to the inward deformation of the bumper stay 12R and the tip of the side member 11R, thus causing the wire 15 to loosen relative to the left tensile force sensor 14L.

When an oblique offset collision occurs at a collision speed of 64 km/h, the pressure collapse level is higher than in the case of the 15-km/h collision but the collision state is substantially the same. As shown in FIG. 7(C), the tensile force measured by the tensile force sensor provided on the side member on the side where the collision occurred, i.e., the right tensile force sensor 14R, decreases from the initial tensile force and the tensile force measured by the tensile force sensor provided on the side member on the side where the collision did not occur, i.e., the left tensile force sensor 14L, decreases gradually from the initial tensile force in a manner that is proportional to the speed at which the bumper stay 12R and the tip of the side member 11R collapse inward. The absolute values of the slopes (i.e., time rates) $\beta_R$ and $\beta_L$ at which the tensile forces decrease from the initial tensile force are larger for the 64-km/h collision than for the 15-km/h collision.

Thus during an oblique offset collision, the tensile force measured by the tensile force sensor provided on the side member on the side where the collision occurred decreases from the initial tensile force and the tensile force measured by the tensile force sensor provided on the side member on the side where the collision did not occur decreases gradually from the initial tensile force. Therefore, when the tensile forces measured by the right tensile force sensor 14R and the left tensile force sensor 14L provided on the side members 11R and 11L are such that one decreases and the other decreases gradually, the control unit 22 identifies the collision state as an oblique offset collision on the side where the rate of decrease in the tensile force is larger.

Processing Executed by Control Unit 22

Figure 8:
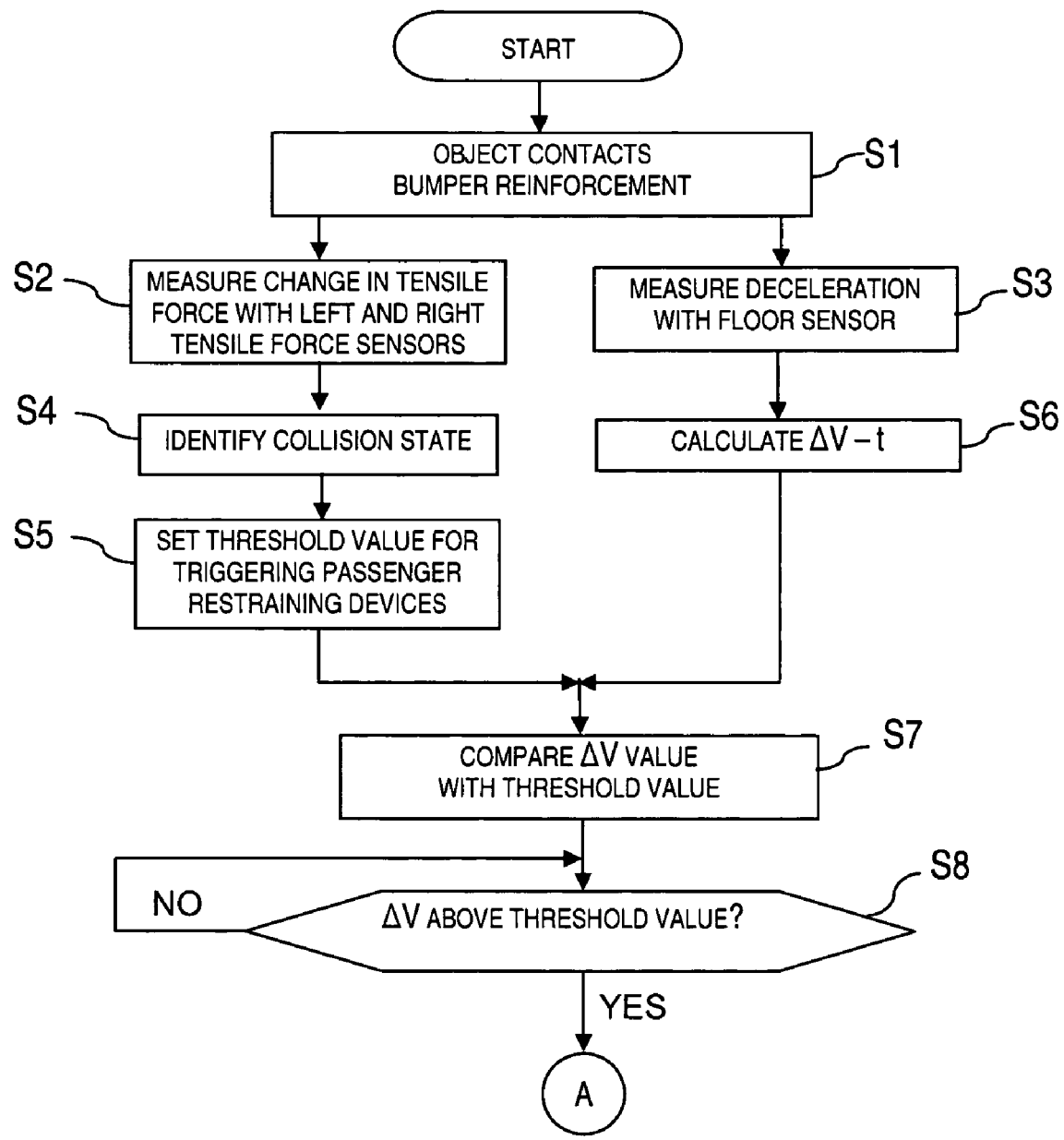
FIG. 8 is a flowchart for explaining the control sequence executed by a vehicle collision state detecting device in accordance with the first embodiment of the present invention during the period from the beginning of a collision until the passenger restraining devices are operated.

Next, the processing the control unit 22 executes during a collision up until it triggers the passenger restraining devices 35 will be explained with reference to FIGS. 8, 9 and 10. As shown in FIG. 8, when the front of the vehicle collides with an object, the object contacts the bumper reinforcement 13 of the vehicle collision state detecting device 10 in step S1.

In step S2, the right tensile force sensor 14R and the left tensile force sensor 14L of the vehicle collision state detecting device 10 measure a change in the tensile force and send their measurement data to the CPU 31 of the control unit 22. In step S3, the floor sensor 18 measures the vehicle deceleration and sends the measured vehicle deceleration to the CPU 31.

In step S4, the CPU 31 recognizes the pattern of change in the tensile forces obtained from the right tensile force sensor 14R and the left tensile force sensor 14L and identifies the collision state or type using the methods described in FIGS. 4 to 7. In step S5, the threshold value setting section 33 of the control unit 22 determines the threshold value for triggering the passenger restraining devices 35 in accordance with the collision state identified in step S4. Each type of collision preferably has a different threshold value for triggering the passenger restraining devices 35.

In step S6, the CPU 31 calculates the velocity $\Delta V$ by determining the first derivative of the deceleration obtained from the floor sensor 18 in step S3 and based on the relationship between the velocity $\Delta V$ and time t.

In step S7; the control unit 22 of the vehicle collision state detecting device 10 compares the threshold value calculated in step S5 to the velocity $\Delta V$ calculated in step S6. In step S8, the control unit 22 determines if the velocity $\Delta V$ exceeds the threshold value. If the CPU 31 determines that the velocity $\Delta V$ does not exceed the threshold value, there is no need to trigger the passenger restraining devices 35 and the processing of step S8 is repeated.

Meanwhile, if the CPU 31 determines that the velocity $\Delta V$ does exceed the threshold value, based on controls executed by the triggering control section 32, it triggers one or more of the passenger restraining devices 35 by sending a signal for triggering the corresponding one or more of the passenger restraining devices 35 through the triggering circuit 34.

Figure 9:
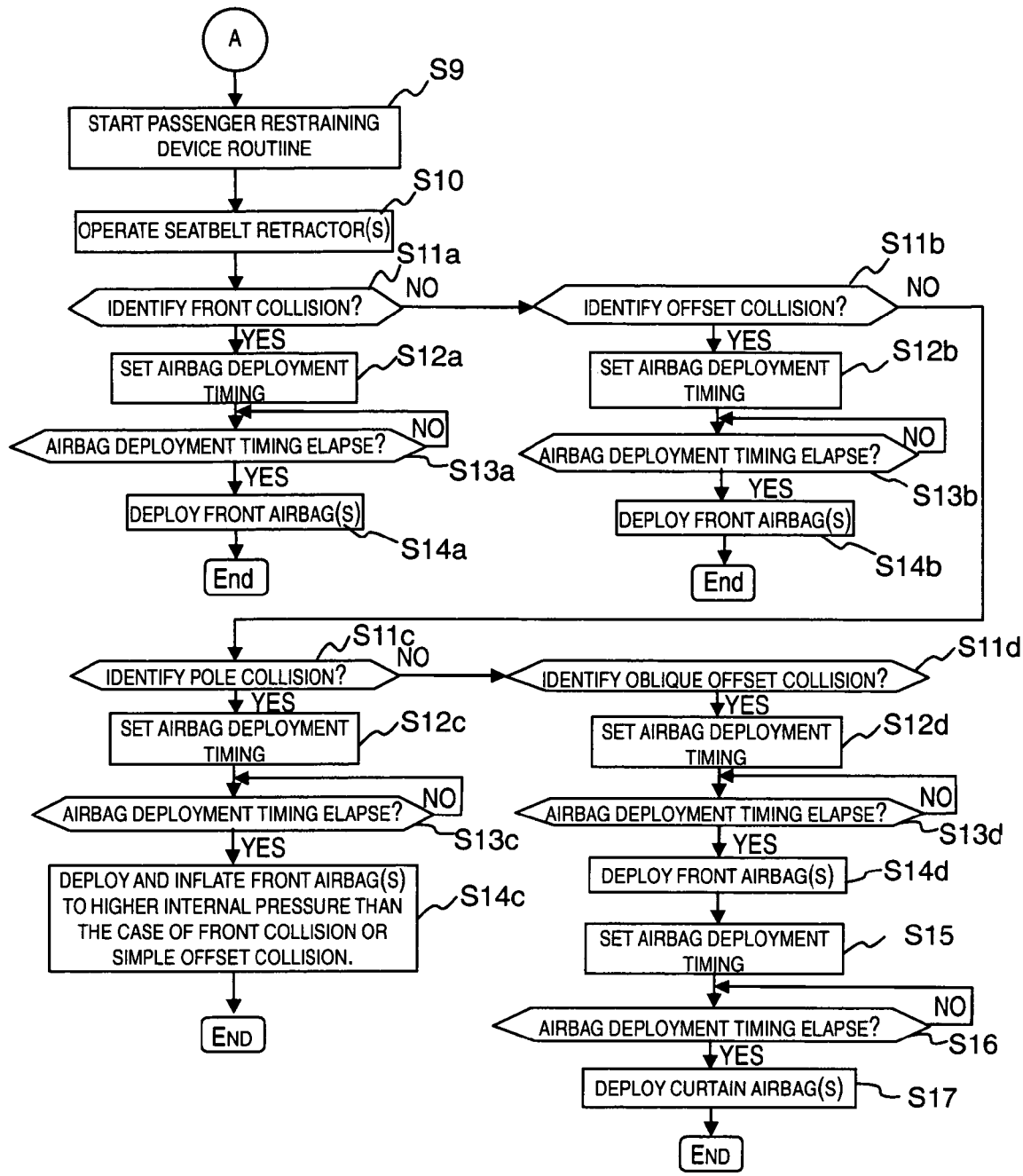
FIG. 9 is a flowchart showing a sequence of controls executed during the period from the beginning of a collision until the passenger restraining devices are operated. It is continuance of FIG. 8.

More specifically, if the CPU 31 determines that the velocity $\Delta V$ exceeds the threshold value in step S8, it proceeds to step S9 of FIG. 9. In step S9, the CPU 31 starts the passenger restraining device routine. Preferably, the CPU 31 first activates the seatbelt retractors of the vehicle in step S10.

In step S11a, the CPU 31 determines if the collision state identified in step S4 of FIG. 8 was a front collision. If the collision state or mode identified in step S4 was a front collision, the CPU 31 proceeds to step S12a where the CPU 31 sets an airbag timing for deploying the front airbags (passenger restraining devices 35) based on the collision state identified (front collision).

Then, in step S13a, the CPU 31 determines if the airbag deployment timing set in step S12a has elapsed. If the airbag deployment timing has elapsed, the CPU 31 by using the triggering control section 32 deploys the front airbags as the passenger restraining devices 35 in step S14a and ends the control sequence.

In step S11b, the CPU 31 determines if the collision state identified in step S4 of FIG. 8 was a simple offset collision. If the collision state or mode identified in step S4 was a simple offset collision, the CPU 31 proceeds to step S12b where the CPU 31 sets an airbag timing for deploying the front airbags (passenger restraining devices 35) based on the collision state identified (simple offset collision).

Then, in step S13b, the CPU 31 determines if the airbag deployment timing set in step S12b has elapsed. If the airbag deployment timing has elapsed, the CPU 31 by using the triggering control section 32 deploys the front airbags as the passenger restraining devices 35 in step S14b and ends the control sequence.

Meanwhile, if the collision state identified in step S4 was neither a front collision nor a simple offset collision, the CPU 31 proceeds to step S11c where it determines if the collision state identified in step S4 of FIG. 8 was a pole collision.

If a pole collision was detected, the CPU 31 proceeds to step S12c where the CPU 31 sets an airbag timing for deploying the front airbags based on the collision state identified (pole collision). Then, in step S13c, the CPU 31 determines if the airbag deployment timing set in step S12b has elapsed. If the airbag deployment timing has elapsed, the CPU 31 by using the triggering control section 32 deploys the front airbags as the passenger restraining devices 35 in step S14c. In a pole collision, the CPU 31 deploys the front airbags (passenger restraining devices 35) such that they are inflated to a higher internal pressure than would be used in the case of a front collision or a simple offset collision. Then the control sequence ends.

Meanwhile, if a pole collision was not detected, the CPU 31 proceeds to step S11d where determines if the collision state identified in step S4 of FIG. 8 was an oblique offset collision.

If an oblique offset collision was detected, the CPU 31 proceeds to step S12d where the CPU 31 sets an airbag timing for deploying the front airbags (passenger restraining devices 35) based on the collision state identified (oblique offset collision). Then, in step S13d, the CPU 31 determines if the airbag deployment timing set in step S12d has elapsed. If the airbag deployment timing has elapsed, the CPU 31 by using the triggering control section 32 deploys the front airbags as the passenger restraining devices 35 in step S14d.

In step S14d, the CPU 31 proceeds to step S12d where the CPU 31 sets an airbag timing for deploying the passenger curtain or side airbags (passenger restraining devices 35) based on the collision state identified (oblique offset collision). Then, in step S16, the CPU 31 determines if the airbag deployment timing set in step S15 has elapsed. If the airbag deployment timing has elapsed, the CPU 31 by using the triggering control section 32 deploys the front airbags as the passenger restraining devices 35 in step S17.

In step S17, the vehicle collision state detecting device 10 deploys the passenger curtain or side airbags (passenger restraining devices 35) approximately 20 milliseconds after the passenger front airbags were deployed and then the control sequence ends.

By executing this kind of control sequence, the vehicle collision state detecting device 10 identifies the collision state and triggers the passenger restraining devices 35 in an appropriate manner based on collision state or type. When it does so, the vehicle collision state detecting device 10 selects the passenger restraining devices 35 it will trigger as appropriate based on the collision state.

Figure 10A:
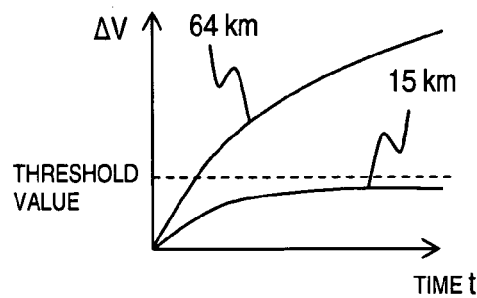
FIG. 10(A) shows plots of the velocity during front collisions at collision speeds of 15 km/h and 64 km/h.
Figure 10A:
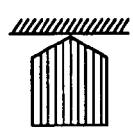
Figure 10B:
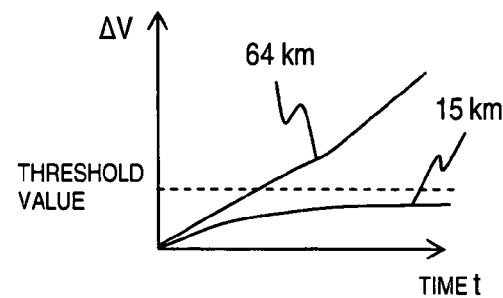
FIG. 10(B) shows plots of the velocity during simple offset collisions at collision speeds of 15 km/h and 64 km/h.
Figure 10B:
Figure 10C:
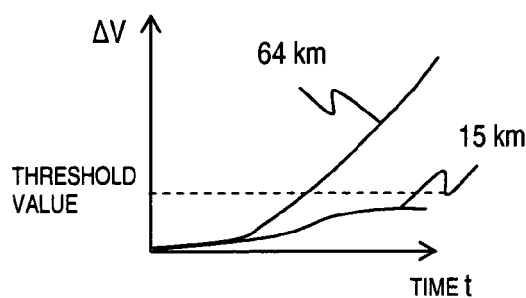
FIG. 10(C) shows plots of the velocity during pole collisions at collision speeds of 15 km/h and 64 km/h.
Figure 10C:
Figure 10D:
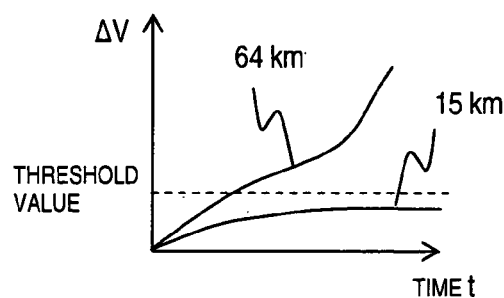
FIG. 10(D) shows plots of the velocity during oblique offset collisions at collision speeds of 15 km/h and 64 km/h.
Figure 10D:
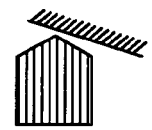

The way the velocity $\Delta V$ found in step S6 in FIG. 8 changes with time changes greatly depending on the collision state and the vehicle collision speed, as shown in FIGS. 10(A)–10(D). FIG. 10(A) shows a plot of the velocity for front collisions at collision speeds of 15 km/h and 64 km/h, FIG. 10(B) shows a plot of the velocity for simple offset collisions at collision speeds of 15 km/h and 64 km/h, FIG. 10(C) shows a plot of the velocity for pole collisions at collision speeds of 15 km/h and 64 km/h, and FIG. 10(D) shows a plot of the velocity for oblique offset collisions at collision speeds of 15 km/h and 64 km/h.

As illustrated in FIGS. 10(A)–(D), the way the velocity $\Delta V$ changes over time changes greatly depending on the collision state and the vehicle collision speed and this difference greatly affects the passenger behavior. Therefore, it is extremely important to determine the threshold value used for triggering the passenger restraining devices 35 in accordance with the particular collision state.

More specifically, when the CPU 31 detects a front collision, as in FIG. 10(A), or a simple offset collision, as in FIG. 10(B), based on the signals received from the right tensile force sensor 14R and the left tensile force sensor 14L, it executes control to start triggering the airbag provided in the center of the steering wheel, the knee airbags in front of the passengers, and the pretensioners of the passenger restraining belts at the moment the velocity $\Delta V$ exceeds the threshold value.

Similarly, when the CPU 31 detects a pole collision, as in FIG. 10(C), based on the signals received from the right tensile force sensor 14R and the left tensile force sensor 14L, it executes control to start triggering the airbag provided in the center of the steering wheel, the knee airbags in front of the passengers, and the pretensioners of the passenger restraining belts at the moment the velocity $\Delta V$ exceeds the threshold value. Furthermore, the CPU 31 executes control to inflate the airbags to a higher internal pressure than in the case of a front collision or offset collision. This is done because in a pole collision there is little material available at the front of the vehicle body to absorb the enormous energy of the collision and the collision energy is transferred directly to the cabin. Thus, with this vehicle collision state detecting device 10, the kinetic energy of the passengers can be absorbed effectively by increasing the internal pressure of the airbags to the maximum pressure that can be permitted without injuring the passengers.

Meanwhile, when the CPU 31 detects an oblique offset collision, as in FIG. 10(D), based on the signals received from the right tensile force sensor 14R and the left tensile force sensor 14L, again, it executes control to start triggering the airbag provided in the center of the steering wheel, the knee airbags in front of the passengers, and the pretensioners of the passenger restraining belts at the moment the velocity $\Delta V$ exceeds the threshold value. Then, approximately 20 milliseconds later, the CPU 31 executes control to deploy the side airbags and the curtain airbags located to the sides of the passengers. This is done because in an oblique offset collision, the behavior of the passengers' upper bodies is such that they fall forward and then fall to the seat. Thus, with this vehicle collision state detecting device 10, the kinetic energy of the passengers can be absorbed effectively by first deploying the front airbags located in front of the passengers and then deploying the side airbags at a later time.

Figures 11, 12:
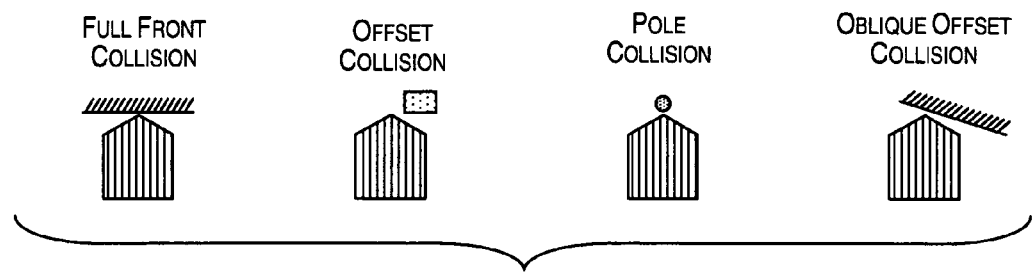
FIG. 11 illustrates the relationships of the deployment timing of the passenger restraining devices with respect to the collision state.
FIG. 12 illustrates the relationship of threshold value with respect to the collision state.

FIG. 11 illustrates how the deployment timing of the passenger restraining devices 35 relates to the collision state. FIG. 12 illustrates the collision state-specific manner in which the threshold value is set.

When the vehicle undergoes a low-speed collision at, for example, approximately 15 km/h, it is preferable not to deploy the airbags. However, the seatbelt retractor will be activated at this velocity. Therefore, although the velocity $\Delta V$ can be calculated for each collision state, it is necessary to have the threshold value setting section 33 set the threshold value such that the airbags will not be deployed when a collision occurs at a collision speed of approximately 15 km/h or less, as shown in FIGS. 10(A)–(D).

When a front collision occurs, the two side members 11R and 11L provided on the left and right sides of the vehicle absorb the collision energy of the vehicle. Since the strength of the engine compartment, which includes the side members 11R and 11L, is high, a high collision G-force is generated against the cabin at the initial stage of the collision. Therefore, the threshold value setting section 33 sets the threshold $\Delta V$ value for a front collision to the highest value of all the collision states, as shown in FIG. 12. The high collision G-force generated in the cabin at the initial stage of a front collision causes the timing at which the passengers' upper bodies begin to fall forward to occur earlier. Therefore, the triggering control section 32 deploys the airbags at an earlier timing for a front collision than for the other collision states, as shown in FIG. 11.

When a simple offset collision occurs, one or the other of the right and left side members 11R and 11L absorbs the vehicle collision energy. Consequently, the collision G-force is smaller than for a front collision. Therefore, the threshold value setting section 33 sets the threshold ΔV value for a simple offset collision to a lower value than for a front collision, as shown in FIG. 12. Meanwhile, in the case of a simple offset collision, the triggering control section 32 deploys the airbags at the latest timing of all the other collision states, as shown in FIGS. 11 and 12.

When a pole collision or oblique offset collision occurs, there is little material to absorb the enormous energy and a comparatively small collision G-force is generated in the cabin at the initial stage of the collision. Then, in the latter half of the collision, a high collision G-force is generated. Since the upper bodies of the passengers fall forward abruptly when a pole collision or oblique offset collision occurs, it is necessary to trigger the airbags and pretensioners early. Therefore, the threshold value setting section 33 sets the threshold value lower for a pole collision or an oblique offset collision than for a simple offset collision, as shown in FIG. 12, and the triggering control section 32 deploys the airbags earlier than for a simple offset collision, as shown in FIG. 11.

The simple offset collision and oblique offset collision mentioned here are described under the assumption that the vehicle collides with a deformable barrier.

Thus, extremely effective collision restriction can be achieved by selectively changing the passenger restraining devices 35 that will be triggered in accordance with the identified collision state or type and also determining both the threshold value for triggering and the timing for deploying the passenger restraining devices 35 in accordance with the identified collision state.

Vehicle Collision State Identification Center

Next, a different method of identifying the vehicle collision state will be described. This method is based on the tensile force balance between the left and right tensile forces of the wire 15.

Assuming the initial tensile force is F', the tensile force FL obtained from the left tensile force sensor 14L and the tensile force FR obtained from the right tensile force sensor 14R take on the following relationships depending on the collision state: in a front collision FL<F', FR<F', and FR≈FL; in a right simple offset collision FL>F' and FR<F'; in a left simple offset collision FL<F' and FR>F'; in a pole collision FL>F' and FR>F'; in an right oblique offset collision FL<F', FR<F', and FR<FL; and in a left oblique offset collision FL<F', FR<F', and FR>FL.

The vehicle collision state detecting device 10 identifies the collision state by matching these relationships between the tensile forces to the respective collision state. When the tensile forces measured by the right tensile force sensor 14R and the left tensile force sensor 14L have not changed with respect to the initial tensile force, the vehicle collision state detecting device 10 has the right tensile force sensor 14R and the left tensile force sensor 14L measure the tensile force again.

The vehicle collision state detecting device 10 distinguishes between front collisions and oblique offset collisions by identifying collisions that occur with an angle of 15 degrees or more between the vehicle and the colliding object as oblique offset collisions and identifying collisions that do not satisfy this angle requirement as front collisions. It accomplishes this by defining the relationship between the tensile forces measured by the right tensile force sensor 14R and the left tensile force sensor 14L (which are provided on the side members 11R and 11L) as follows: the relationship "|FR−FL|<a prescribed value" indicates a front collision and the relationship "|FR−FL|≧a prescribed value" indicates an oblique offset collision.

Figure 13:
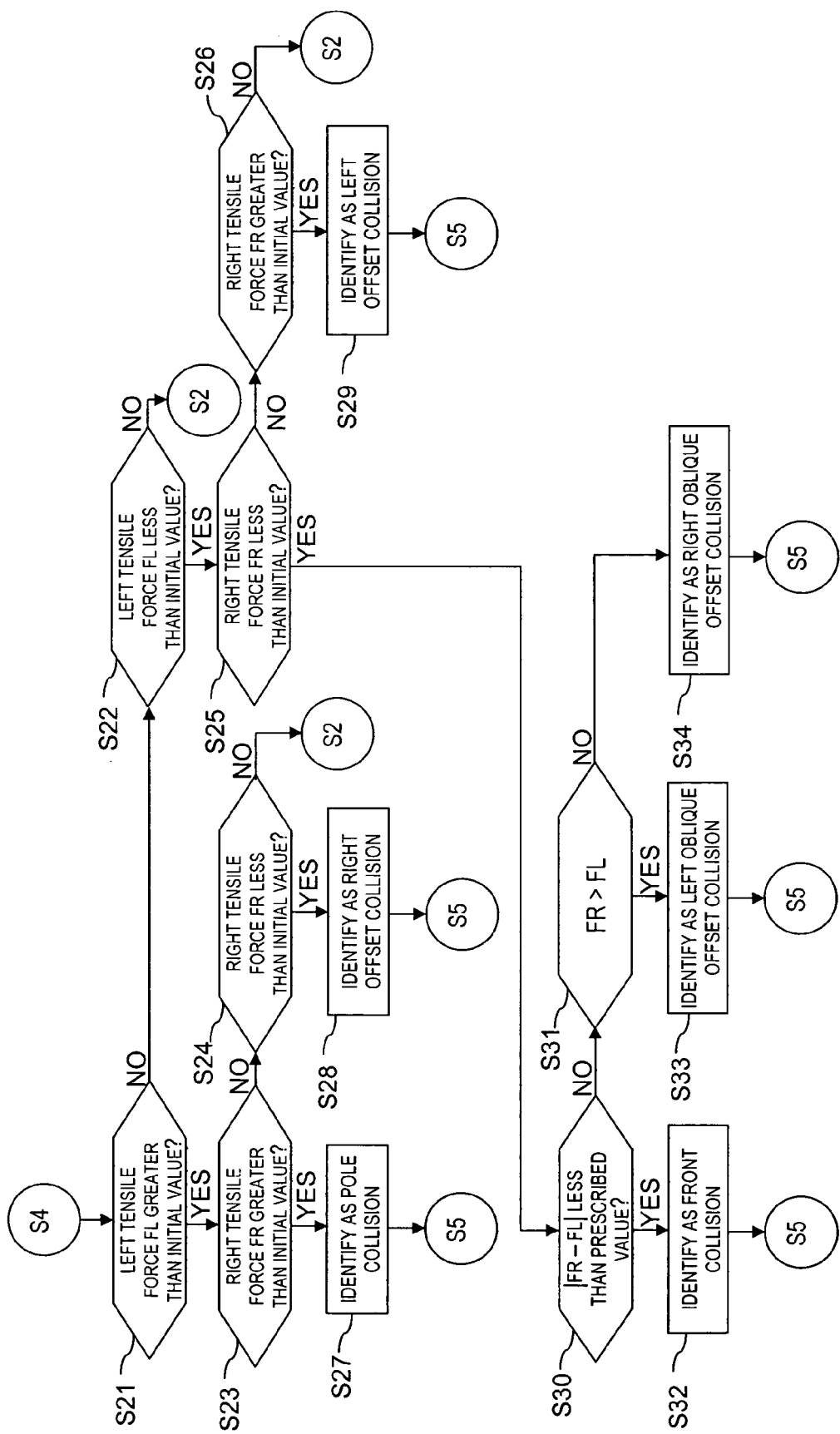
FIG. 13 is a flowchart showing the control sequence executed during the step S4 of FIG. 8 in which the collision state is identified.

In order to accomplish this method of identifying the vehicle collision state, the vehicle collision state detecting device 10 executes the control sequence shown in FIG. 13 when it identifies the vehicle mode in step S4 of FIG. 8.

Thus, as shown in FIG. 13, in step S21 the CPU 31 determines if the tensile force FL obtained from the left tensile force sensor 14L is larger than the initial tensile force F'.

If the CPU 31 determines that the tensile force FL is not larger than the initial tensile force F', it proceeds to step S22 where it determines if the tensile force FL obtained from the left tensile force sensor 14L is smaller than the initial tensile force F'.

If the CPU 31 determines that the tensile force FL is not smaller than the initial tensile force F', the relationship FL=F' exists and the CPU 31 proceeds to step S2 of FIG. 8 to execute measurement of the tensile forces by the right tensile force sensor 14R and the left tensile force sensor 14L again. Meanwhile, if the CPU 31 determines that the tensile force FL is smaller than the initial tensile force F', it proceeds to step S25 where it determines if the tensile force FR obtained from the right tensile force sensor 14R is smaller than the initial tensile force F'.

If the CPU 31 determines that the tensile force FR is smaller than the initial tensile force F', it proceeds to step S30 where it determines if the absolute value of the difference between the tensile force FR obtained from the right tensile force sensor 14R and the tensile force FL obtained from the left tensile force sensor 14L, i.e., |FR−FL|, is smaller than a prescribed value. The prescribed value is set such that it is larger than the absolute value |FR−FL| when the angle between the vehicle and the colliding object is 15 degrees or larger.

If the CPU 31 determines that the absolute value |FR−FL| is smaller than the prescribed value, then the relationships FL<F', FR<F', FR≈FL, and |FR−FL|<prescribed value exist and the CPU 31 proceeds to step S32, where it identifies the collision as a front collision and proceeds to step S5 of FIG. 8. Meanwhile, if the CPU 31 determines that the absolute value |FR−FL| is not smaller than the prescribed value, it proceeds to step S31 where it determines if the tensile force FR obtained from the right tensile force sensor 14R is larger than the tensile force FL obtained from the left tensile force sensor 14L.

If the CPU 31 determines that the tensile force FR is larger than the tensile force FL, then the relationships FL<F', FR<F', FR>FL, and |FR−FL|≧prescribed value exist and the CPU 31 proceeds to step S33, where it identifies the collision as a left oblique offset collision and proceeds to step S5 of FIG. 8. Meanwhile, if the CPU 31 determines that the tensile force FR is not larger than the tensile force FL, then the relationships FL<F', FR<F', FR<FL, and |FR−FL|≧prescribed value exist and the CPU 31 proceeds to step S34, where it identifies the collision as a right oblique offset collision and proceeds to step S5 of FIG. 8.

If the CPU 31 determines that the tensile force FR is not smaller than the initial tensile force F' in step S25, then it proceeds to step S26 where it determines if the tensile force FR obtained from the right tensile force sensor 14R is larger than the initial tensile force F'.

If the CPU 31 determines that the tensile force FR is not larger than the initial tensile force F', then the relationship FR=F' exists and the CPU 31 proceeds to step S2 of FIG. 8 to execute measurement of the tensile forces by the right tensile force sensor 14R and the left tensile force sensor 14L again. Meanwhile, if the CPU 31 determines that the tensile force FR is larger than the initial tensile force F', then the relationships FL<F' and FR>F' exist and the CPU 31 proceeds to step S29, where it identifies the collision as left simple offset collision and proceeds to step S5 of FIG. 8.

If the CPU 31 determines that the tensile force FL is larger than the initial force F' in step S21, then it proceeds to step S23 and determines if the tensile force FR obtained from the right tensile force sensor 14R is larger than the initial tensile force F'.

If the CPU 31 determines that the tensile force FR is larger than the initial tensile force F', then the relationships FL>F' and FR>F' exist and the CPU 31 proceeds to step S27, where it identifies the collision as a pole collision and proceeds to step S5 of FIG. 8. Meanwhile, if the CPU 31 determines that the tensile force FR is not larger than the initial tensile force F', then it proceeds to step S24 where it determines if the tensile force FR obtained from the right tensile force sensor 14R is smaller than the initial tensile force F'.

If the CPU 31 determines that the tensile force FR is not smaller than the initial tensile force F', then the relationship FR=F' exists and the CPU 31 proceeds to step S2 of FIG. 8 to execute measurement of the tensile forces by the right tensile force sensor 14R and the left tensile force sensor 14L again. Meanwhile, if the CPU 31 determines that the tensile force FR is smaller than the initial tensile force F', then the relationships FL>F' and FR<F' exist and the CPU 31 proceeds to step S28, where it identifies the collision as a right simple offset collision. The CPU 31 then proceeds to step S5 of FIG. 8.

By executing this kind of control sequence, the vehicle collision state detecting device 10 can identify the collision state based on the balance between the left and right tensile forces of the wire 15 and selectively change which passenger restraining devices 35 it will trigger based on the identified collision state.

As described in detail heretofore, in a vehicle collision state detecting device 10 in accordance with the first embodiment, at the beginning of a vehicle collision the contact of the colliding object with the bumper reinforcement 13 causes the tensile force in the wire 15 to change. The right tensile force sensor 14R and the left tensile force sensor 14L connected to opposite ends of the wire 15 measure the tensile force in the wire 15 and the vehicle collision state detecting device 10 identifies the collision state based on the balance between the left and right tensile forces of the wire 15 measured by the sensors. In this way, a wide range of collision states can be identified. More particularly, the vehicle collision state detecting device 10 uses an extremely simple system in which a wire 15 is arranged at approximately the tip end of the vehicle and the tensile force as well as the occurrence of changes in tensile force are detected. This system can identify the collision state accurately and easily at the initial stage of a collision and, even though it is simple, it can identify many different collision states. The vehicle collision state detecting device 10 is provided with a right tensile force sensor 14R and a left tensile force sensor 14L that measure the tensile force in the wire 15, which is arranged crosswise between the side members 11R and 11L. The right tensile force sensor 14R and the left tensile force sensor 14L measure changes in the tensile force, enabling reliable identification of the collision state. Also, since the vehicle collision state detecting device 10 has a wire 15 arranged on the approximate tip end of the vehicle and identifies the collision state based on the balance between the left and right forces in the wire 15, it can detect a collision immediately after it occurs and identify the collision state right away. By designing the control unit 22 to identify the collision state based on the balance between the tensile forces on the left and right of the vehicle, the vehicle collision state detecting device 10 can serve as a simple and cost-effective system capable of identifying a variety of collision states (e.g., front collision, simple offset collision, pole collision, and oblique offset collision) based solely on the balance between the tensile forces on the left and right of the vehicle.

By using the control unit 22, the vehicle collision state detecting device 10 can identify the collision state as that of a front collision by detecting that the tensile forces measured by the right tensile force sensor 14R and the left tensile force sensor 14L have both decreased below the initial tensile force existing before the collision and that the two tensile forces are approximately equal to each other.

By using the control unit 22, the vehicle collision state detecting device 10 can identify the collision state as that of a simple offset collision by detecting that the tensile force measured by the tensile force sensor on the side where the collision occurred has decreased below the initial tensile force that existed before the collision and the tensile force measured by the tensile force sensor on the side where the collision did not occur has increased above the initial tensile force that existed before the collision.

By using of the control unit 22, the vehicle collision state detecting device 10 can identify the collision state as that of a pole collision by detecting that the tensile forces measured by the right tensile force sensor 14R and the left tensile force sensor 14L have both increased above the initial tensile force existing before the collision.

By using the control unit 22, the vehicle collision state detecting device 10 can identify the collision state as that of an oblique offset collision by detecting that the tensile forces measured by the right tensile force sensor 14R and the left tensile force sensor 14L both decreased below the initial tensile force existing before the collision and that the two tensile forces are not approximately equal to each other. Thus, the vehicle collision state detecting device 10 can accurately identify a variety of collision states (e.g., front collision, simple offset collision, pole collision, and oblique offset collision) by using the control unit 22 to identify the patterns of change in the tensile forces measured by the right tensile force sensor 14R and the left tensile force sensor 14L.

By using the control unit 22 to identify the collision state based on the balance between the tensile forces on the left and right of the vehicle and determine a threshold value for triggering the passenger restraining devices 35 in accordance with the identified collision state, the vehicle collision state detecting device 10 can eliminate late triggering of the passenger restraining devices 35 and trigger passenger restraining devices 35 that are well suited to the particular collision state can be triggered, thus enabling extremely effective collision restriction to be contrived.

The vehicle collision state detecting device 10 can also avoid unnecessary triggering of the passenger restraining devices 35 by using the control unit 22 to calculate a velocity waveform with respect to time based on the deceleration measured by the floor sensor 18 provided in the cabin and operating the passenger restraining devices 35 based on the calculated velocity waveform and the determined threshold value.

The side members 11R and 11L possess such a rigidity balance that they collapse inward at a portion thereof that is in front of or to the rear of right tensile force sensor 14R and/or the left tensile force sensor 14L when the vehicle body is subjected to a load oriented in the widthwise direction of the vehicle, such as during an oblique offset collision. By thus controlling the deformation mode of the side members 11R and 11L, the vehicle collision state detecting device 10 can identify the collision state in a reliable manner.

The vehicle collision state detecting device 10 is also provided with the lock mechanisms 16R and 16L configured to divide and fix the wire 15 in such a manner that independent tensile forces are generated in the left and right of the wire 15 when a left or right offset collision occurs. As a result, different tensile force values can be measured by the right tensile force sensor 14R and the left tensile force sensor 14L and used for identifying the collision state.

More specifically, the lock mechanisms 16R and 16L of the vehicle collision state detecting device 10 has a plurality of protruding parts 42 arranged around a plurality of stopper parts 41 that are connected to the wire 15. When a load is imparted to the protruding parts 42, the structure in the vicinity of the protruding parts 42 deforms and the protruding parts 42 interfere with the stopper parts 41, thus restricting the movement of the stopper parts 41. As a result, the wire 15 can be fixed and the right tensile force sensor 14R and left tensile force sensor 14L provide on the right and left side members 11R and 11L can be made to measure different tensile force values.

Second Embodiment

Referring now to FIGS. 14–21, the CPU 31 of the vehicle collision state detecting device 10 is programmed in accordance with a second embodiment. In view of the similarity between the first and second embodiments, the parts of the second embodiment that are identical to the parts of the first embodiment will be given the same reference numerals symbols and/or step number as the parts of the first embodiment. Moreover, the descriptions of the parts of the second embodiment that are identical to the parts of the first embodiment may be omitted for the sake of brevity.

The vehicle collision state detecting device 10 of the second embodiment is configured similarly to the vehicle collision state detecting device 10 of the first embodiment. In particular, the vehicle collision state detecting device 10 of the second embodiment is designed to determine the timing at which the passenger restraining devices will be triggered based on the amount of decrease with respect to time in the tensile forces measured by the left and right tensile force sensors.

Now the processing executed by the vehicle collision state detecting device 10 of the second embodiment from the beginning of a collision until the passenger restraining devices 35 are triggered will be described with reference to the flowchart of FIG. 14.

Figure 14:
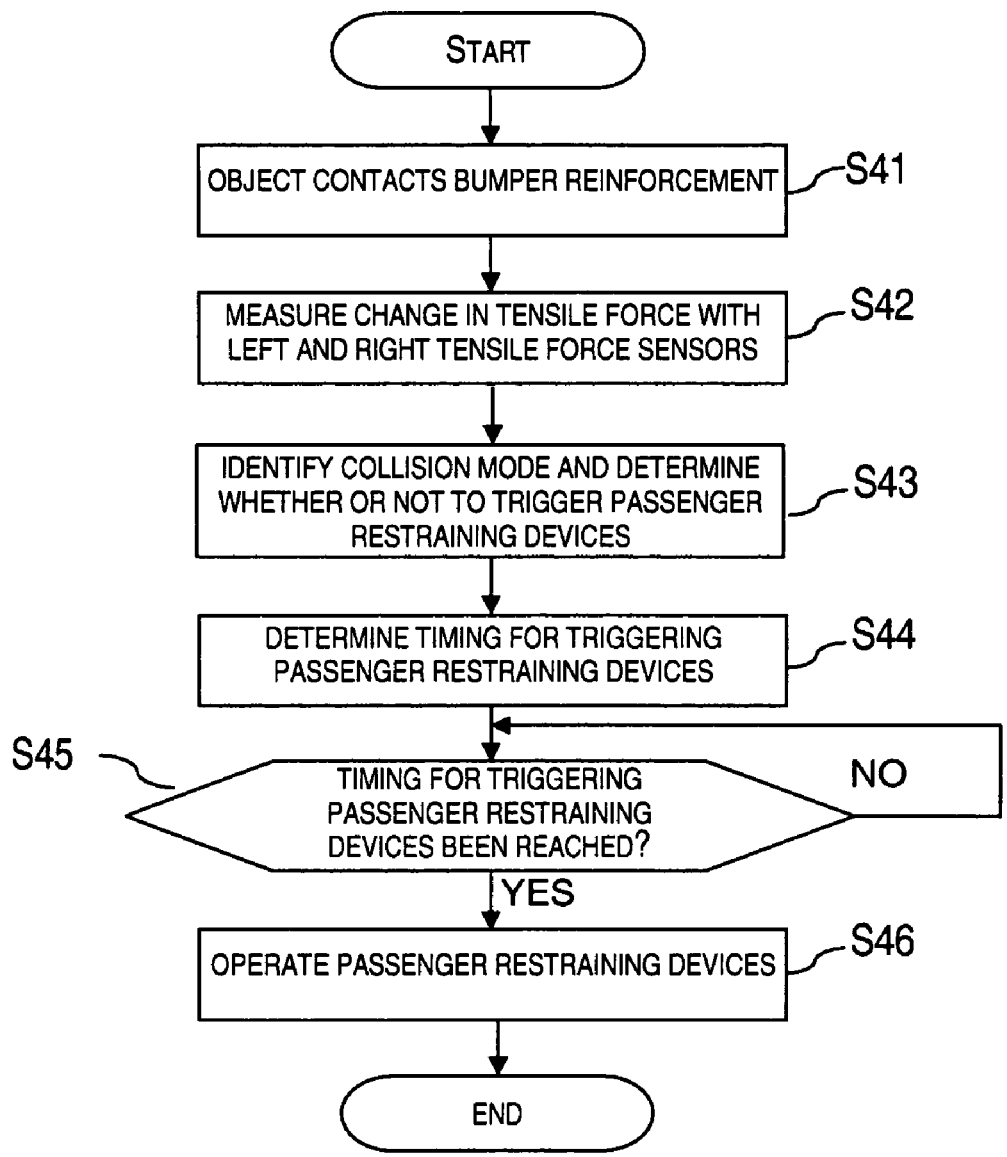
FIG. 14 is a flowchart for explaining the control sequence executed by a vehicle collision state detecting device in accordance with a second embodiment of the present invention during the period from the beginning of a collision until the passenger restraining devices are operated.

As shown in FIG. 14, when the front of the vehicle collides with an object, the object contacts the bumper reinforcement 13 of the vehicle collision state detecting device 10 in step S41.

In step S42, the right tensile force sensor 14R and the left tensile force sensor 14L of the vehicle collision state detecting device 10 measure a change in the tensile forces.

In step S43, the CPU 31 recognizes the pattern of change in the tensile forces obtained from the right tensile force sensor 14R and the left tensile force sensor 14L and identifies the collision state. The CPU 31 also determines a reference value for determining if it is necessary to trigger the passenger restraining devices 35 and executes processing to determine if the passenger restraining devices 35 should be triggered.

In step S44, the CPU 31 calculates the slopes (i.e., time rates) of tensile forces, which have decreased from the initial tensile force, based on the relationship between the tensile force F and time t. Based on these slopes, the CPU 31 determines the timing period for triggering the passenger restraining devices 35. The triggering timing period is determined in this manner because the slopes along which the tensile forces decrease from the initial tensile force are approximately proportional to the collision speed.

In step S45, the CPU 31 determines if the triggering timing for the passenger restraining devices 35 has been reached. More specifically, the CPU 31 establishes a prescribed reference value for the slope(s) of the tensile force(s) and decides to trigger the passenger restraining devices 35 when the absolute value(s) of the slope(s) is greater than the reference value and not to trigger the passenger restraining devices 35 when the absolute value(s) of the slope(s) is less than the reference value. The CPU 31 also begins counting time at the moment the initial tensile forces measured by the right tensile force sensor 14R and left tensile force sensor 14L provided on the side members 11R and 11L begin to change and triggers the passenger restraining devices 35 when the triggering timing period for the passenger restraining devices 35 has elapsed.

If it determines that the triggering timing for the passenger restraining devices 35 has not been reached, the CPU 31 repeats the processing of step S45 until triggering timing for the passenger restraining devices 35 is reached.

Meanwhile, if it determines that the triggering timing for the passenger restraining devices 35 has been reached, the CPU 31 proceeds to step S46 where, based on controls executed by the triggering control section 32, it triggers the passenger restraining devices 35 by sending a signal for triggering the passenger restraining devices 35 through the triggering circuit 34. Then the control sequence ends.

By executing this kind of control sequence, the vehicle collision state detecting device 10 identifies the collision state and selectively triggers the passenger restraining devices 35 in accordance with the collision state.

Passenger Restraining Device Triggering Determination

The identification of the collision state and the determination of whether or not to trigger the passenger restraining devices 35 that take place in step S43 of FIG. 14 will now be described in more detail using FIGS. 15 to 21.

As shown in FIGS. 4 to 7, the term $\beta_R$ is the slope (time rate) at which the tensile force F measured by the right tensile force sensor 14R provided on the right side member 11R decreases from the initial tensile force and is obtained from the relationship between the tensile force F and time t. Meanwhile, the term $\beta_L$ is the slope (time rate) at which the tensile force F measured by the left tensile force sensor 14R provided on the left side member 11L decreases from the initial tensile force and is obtained from the relationship between the tensile force F and time t. The reference value is also a slope and is indicated as $\beta'$.

Figure 15:
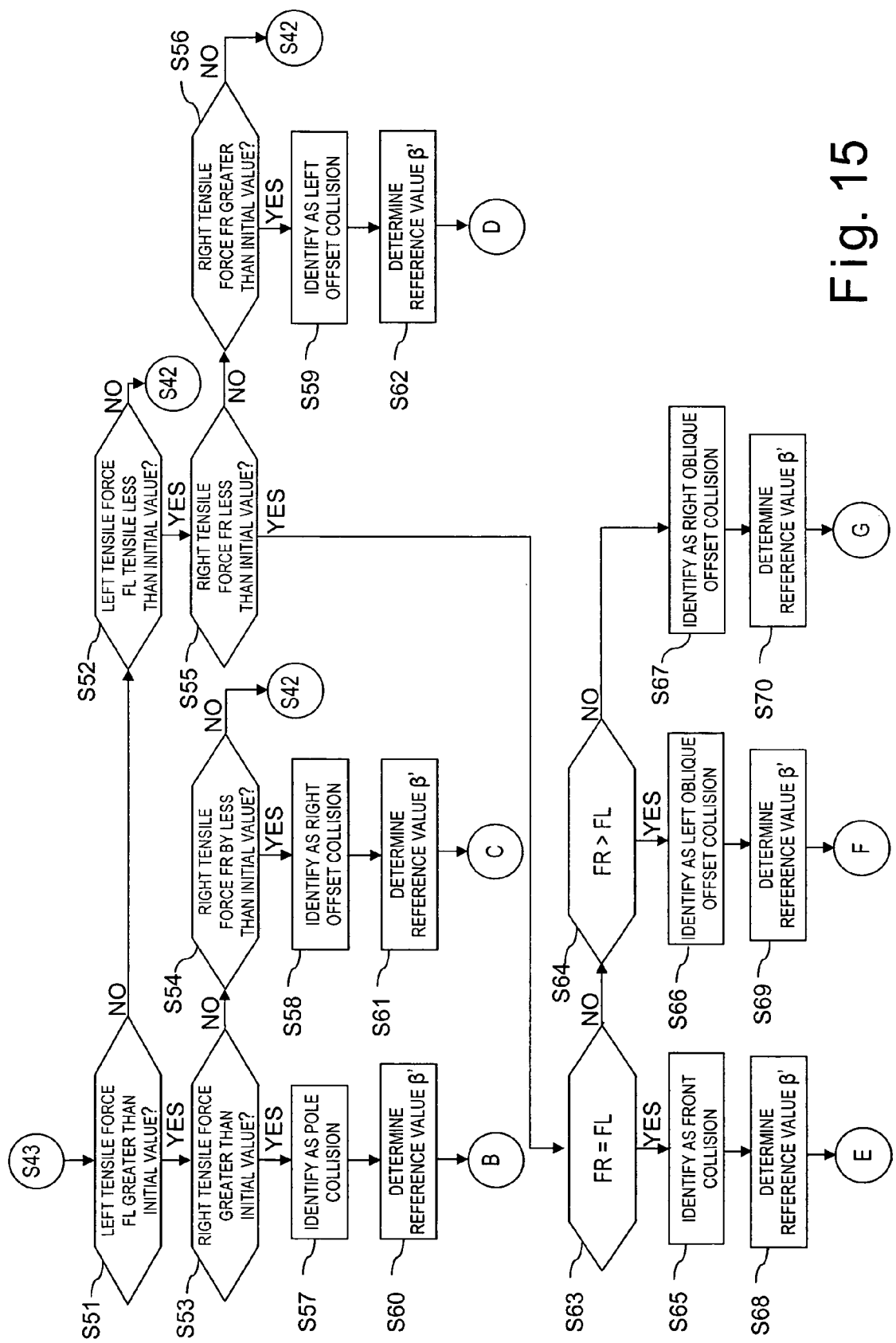
FIG. 15 is a flowchart showing the sequence of controls executed in order to identify the collision state in during step S43 of FIG. 14 in which the collision state is identified and whether or not to trigger the passenger restraining devices is determined.

First, the CPU 31 executes processing to identify the collision state. Thus, as shown in FIG. 15, in step S51 the CPU 31 determines if the tensile force FL obtained from the left tensile force sensor 14L is larger than the initial tensile force F'.

If the CPU 31 determines that the tensile force FL is not larger than the initial tensile force F', it proceeds to step S52 where it determines if the tensile force FL obtained from the left tensile force sensor 14L is smaller than the initial tensile force F'.

If the CPU 31 determines that the tensile force FL is not smaller than the initial tensile force F', the relationship FL=F' exists and the CPU 31 proceeds to step S42 of FIG. 14 to execute measurement of the tensile forces by the right tensile force sensor 14R and the left tensile force sensor 14L again. Meanwhile, if the CPU 31 determines that the tensile force FL is smaller than the initial tensile force F', it proceeds to step S55 where it determines if the tensile force FR obtained from the right tensile force sensor 14R is smaller than the initial tensile force F'.

If the CPU 31 determines that the tensile force FR is smaller than the initial tensile force F', it proceeds to step S63 where it determines if the tensile force FR obtained from the right tensile force sensor 14R and the tensile force FL obtained from the left tensile force sensor 14L are equal.

If the CPU 31 determines that the tensile force FR and the tensile force FL are equal, then the relationships FL<F', FR<F', and FR=FL exist and the CPU 31 proceeds to step S65, where it identifies the collision as a front collision. Then, in step S68, the CPU 31 calculates and determines the reference value $\beta$ and proceeds to the steps shown in FIG. 19 (discussed later), which are for determining whether or not to trigger the passenger restraining devices 35 during a front collision. Meanwhile, if the CPU 31 determines that the tensile force FR and the tensile force FL are not equal in step S63, then it proceeds to step S64 where it determines if the tensile force FR obtained from the right tensile force sensor 14R is larger than the tensile force FL obtained from the left tensile force sensor 14L.

If the CPU 31 determines that the tensile force FR is larger than the tensile force FL, then the relationships FL<F', FR<F', and FR>FL exist and the CPU 31 proceeds to step S66 where it identifies the collision as a left oblique offset collision. Then in step S69, the CPU 31 calculates and determines the reference value $\beta$' and proceeds to the steps shown in FIG. 20 (discussed later), which are for determining whether or not to trigger the passenger restraining devices 35 during a left oblique offset collision. Meanwhile, if the CPU 31 determines that the tensile force FR is not larger than the tensile force FL in step S64, then the relationships FL<⁻F', FR<F', and FR<FL exist and the CPU 31 proceeds to step S67 where it identifies the collision as a right oblique offset collision. Then in step S70, the CPU 31 calculates and determines the reference value $\beta$' and proceeds to the steps shown in FIG. 21 (discussed later), which are for determining whether or not to trigger the passenger restraining devices 35 during a right oblique offset collision.

If the CPU 31 determines that the tensile force FR is not smaller than the initial tensile force F' in step S55, then it proceeds to step S56 where it determines if the tensile force FR obtained from the right tensile force sensor 14R is larger than the initial tensile force F'.

If the CPU 31 determines that the tensile force FR is not larger than the initial tensile force F', then the relationship FR=F' exists and the CPU 31 proceeds to step S42 of FIG. 14 to execute measurement of the tensile forces by the right tensile force sensor 14R and the left tensile force sensor 14L again. Meanwhile, if the CPU 31 determines that the tensile force FR is larger than the initial tensile force F', then the relationships FL<F' and FR>F' exist and the CPU 31 proceeds to step S59 where it identifies the collision as left simple offset collision. Then in step S62, the CPU 31 calculates and determines the reference value $\beta$' and proceeds to the steps shown in FIG. 18 (discussed later), which are for determining whether or not to trigger the passenger restraining devices 35 during a left simple offset collision.

If the CPU 31 determines that the tensile force FL is larger than the initial force F' in step S51, then it proceeds to step S53 and determines if the tensile force FR obtained from the right tensile force sensor 14R is larger than the initial tensile force F'.

If the CPU 31 determines that the tensile force FR is larger than the initial tensile force F', then the relationships FL>F' and FR>F' exist and the CPU 31 proceeds to step S57, where it identifies the collision as a pole collision. Then in step S60, the CPU 31 calculates and determines the reference value $\beta$' and proceeds to the steps shown in FIG. 16 (discussed later), which are for determining whether or not to trigger the passenger restraining devices 35 during a pole collision. Meanwhile, if the CPU 31 determines that the tensile force FR is not larger than the initial tensile force F', then it proceeds to step S54 where it determines if the tensile force FR obtained from the right tensile force sensor 14R is smaller than the initial tensile force F'.

If the CPU 31 determines that the tensile force FR is not smaller than the initial tensile force F', then the relationship FR=F' exists and the CPU 31 proceeds to step S42 of FIG. 14 to execute measurement of the tensile forces by the right tensile force sensor 14R and the left tensile force sensor 14L again. Meanwhile, if the CPU 31 determines that the tensile force FR is smaller than the initial tensile force F', then the relationships FL>F' and FR<F' exist and the CPU 31 proceeds to step S58 where it identifies the collision as a right simple offset collision. Then in step S61, the CPU 31 calculates and determines the reference value $\beta$' and proceeds to the steps shown in FIG. 17 (discussed later), which are for determining whether or not to trigger the passenger restraining devices 35 during a right simple offset collision.

The vehicle collision state detecting device 20 can identify the collision state based on the balance between the left and right forces by executing a control sequence similar to that of step S4 of FIG. 8 in the first embodiment. After identifying the collision state, the CPU 31 determines whether or not to trigger the passenger restraining devices 35 and it makes this determination in a manner tailored to the collision state, as indicated in FIGS. 16 to 21. If it decides to trigger the passenger restraining devices 35, the CPU 31 then determines the triggering timing period.

The determination of whether or not to trigger the passenger restraining devices 35 during a pole collision will now be described using FIG. 16.

Figure 16:
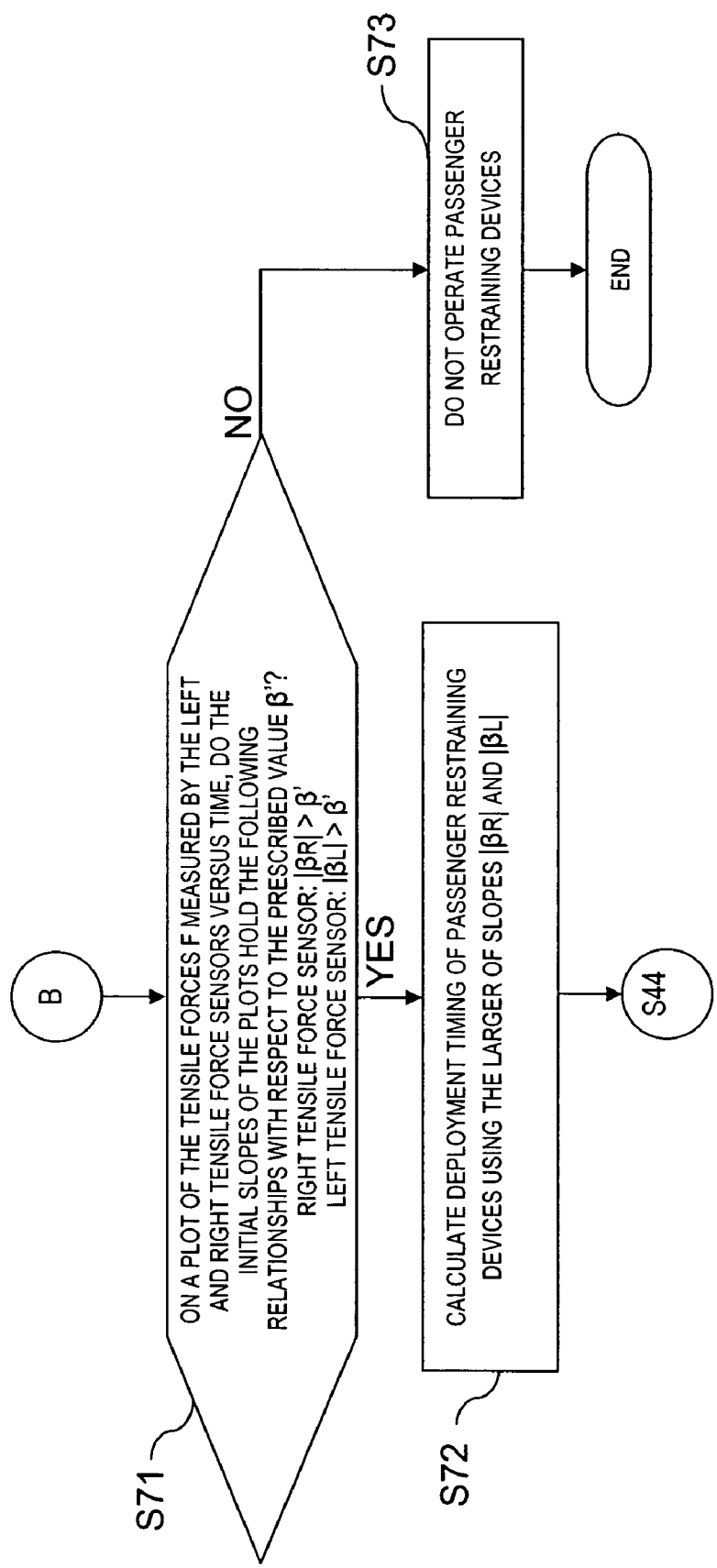
FIG. 16 is a flowchart showing the sequence of controls executed in order to determine whether or not to trigger the passenger restraining devices during a pole collision.

After identifying the collision as a pole collision in step S57 of FIG. 15 and determining the reference value $\beta$' in step S60, the CPU 31 proceeds to step S71 of FIG. 16 where, based on a plot of the tensile force measured by the right tensile force sensor 14R with respect to time and a plot of the tensile force measured by the left tensile force sensor 14L with respect to time, it determines if the initial slopes $\beta_R$ and $\beta_L$ satisfy the relationships $|\beta_R|>|\beta'|$ and $|\beta_L|>|\beta'|$.

If it determines that both relationships $|\beta_R|>|\beta'|$ and $|\beta_L|>|\beta'|$ are satisfied, the CPU 31 proceeds to step S72 where it compares $|\beta_R|$ and $|\beta_L|$ and uses the larger of the two to refer to a prescribed data bank in order to calculate and determine the deployment timing period for the passenger restraining devices 35. It then proceeds to step S44 of FIG. 14. Meanwhile, if it determines that either (or both) of the relationships $|\beta_R|>|\beta'|$ and $|\beta_L|>|\beta'|$ is not satisfied, the CPU 31 proceeds to step S73 where it ends the control sequence directly without operating the passenger restraining devices 35.

By executing this kind of control sequence, the CPU 31 can determine whether or not to trigger the passenger restraining devices 35 during a pole collision.

Next, the determination of whether or not to trigger the passenger restraining devices 35 during a right simple offset collision will be described using FIG. 17.

Figure 17:
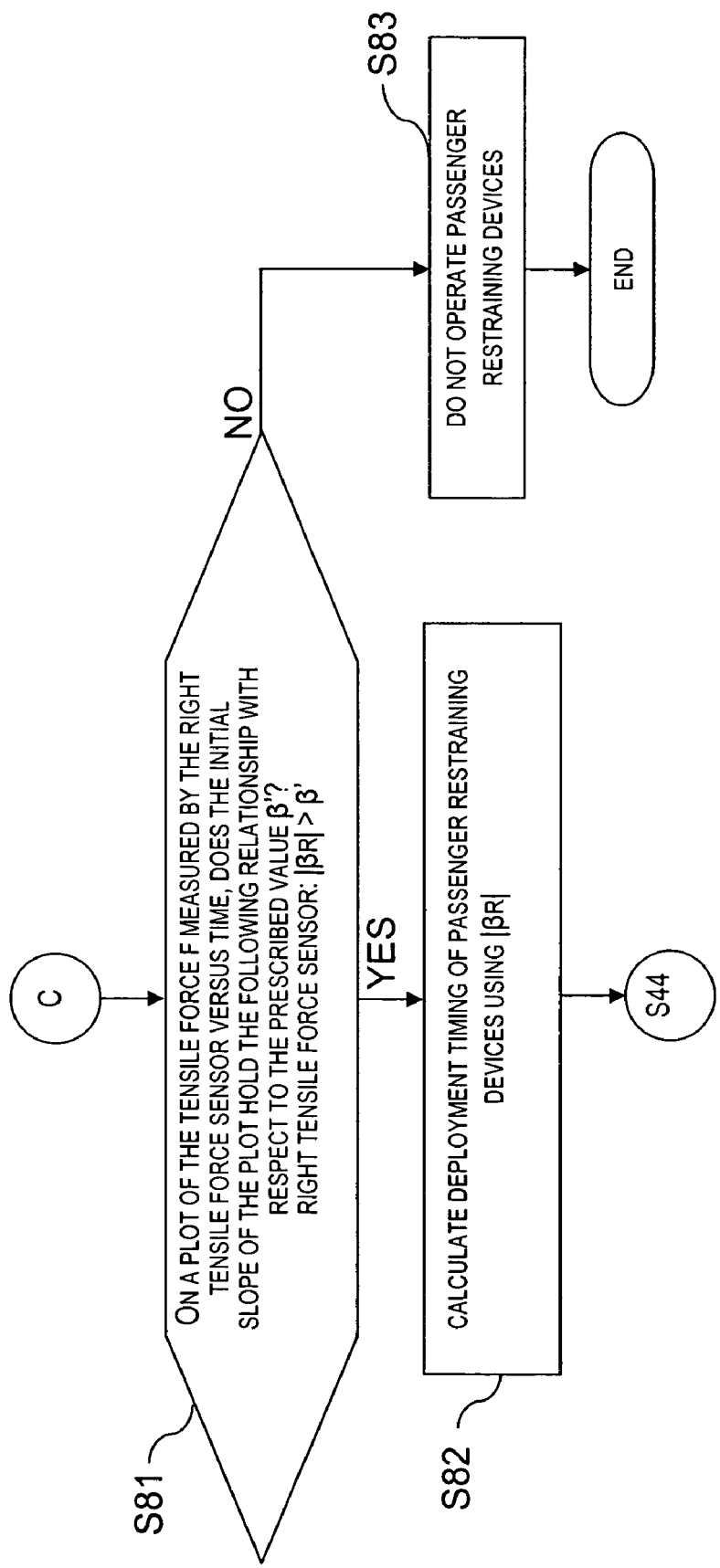
FIG. 17 is a flowchart showing the sequence of controls executed in order to determine whether or not to trigger the passenger restraining devices during a right simple offset collision.

After identifying the collision as a right simple offset collision in step S58 of FIG. 15 and determining the reference value $\beta'$ in step S61, the CPU 31 proceeds to step S81 of FIG. 17 where, based on a plot of the tensile force measured by the right tensile force sensor 14R with respect to time, it determines if the initial slope $\beta_R$ satisfies the relationship $|\beta_R|>|\beta'|$.

If it determines that the relationship $|\beta_R|>|\beta'|$ is satisfied, the CPU 31 proceeds to step S82 where it refers to a prescribed data bank using $|\beta_R|$ in order to calculate and determine the deployment timing period for the passenger restraining devices 35. It then proceeds to step S44 of FIG. 14. Meanwhile, if it determines that the relationship $|\beta_R|>|\beta'|$ is not satisfied, the CPU 31 proceeds to step S83 where it ends the control sequence directly without operating the passenger restraining devices 35.

By executing this kind of control sequence, the CPU 31 can determine whether or not to trigger the passenger restraining devices 35 during a right simple offset collision.

Next, the determination of whether or not to trigger the passenger restraining devices 35 during a left simple offset collision will be described using FIG. 18.

Figure 18:
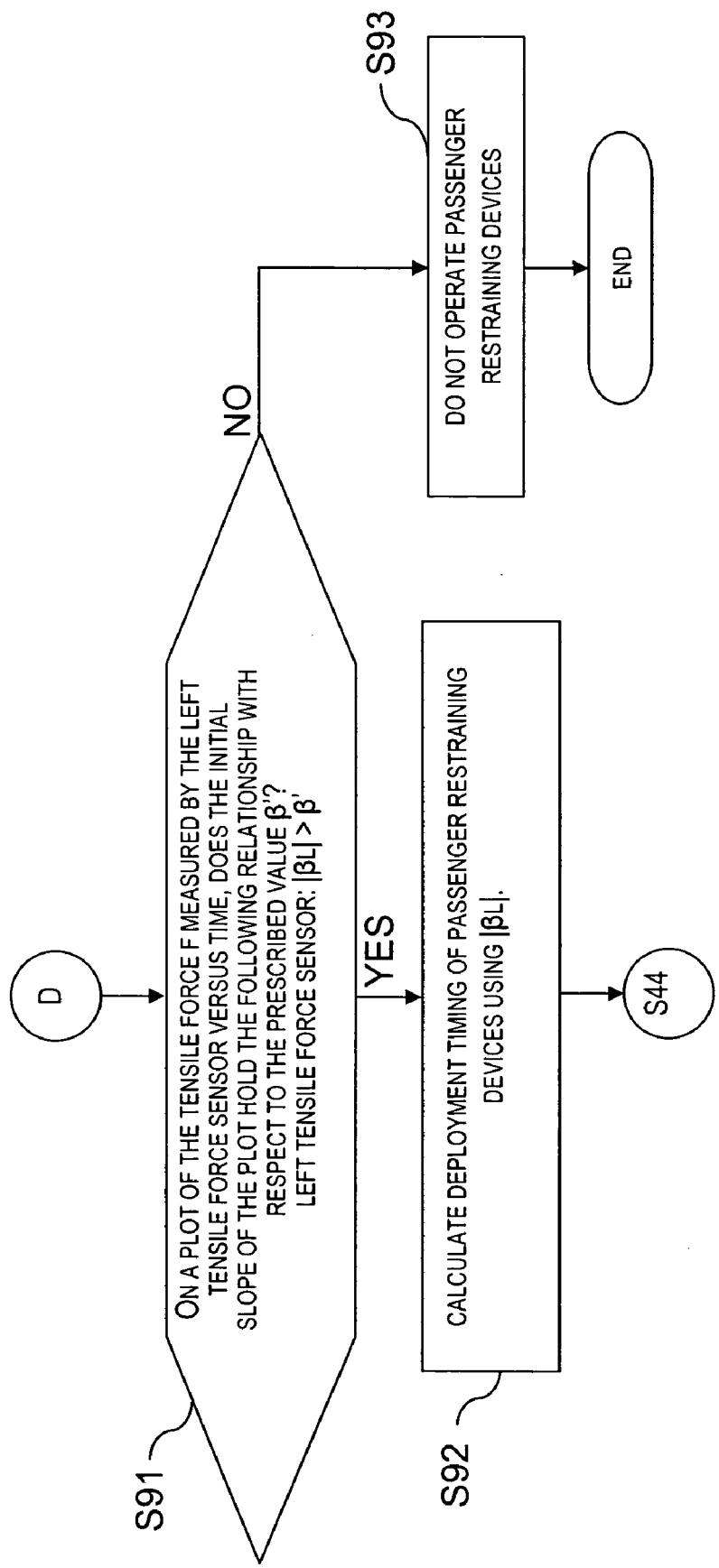
FIG. 18 is a flowchart showing the sequence of controls executed in order to determine whether or not to trigger the passenger restraining devices during a left simple offset collision.

After identifying the collision as a left simple offset collision in step S59 of FIG. 15 and determining the reference value $\beta'$ in step S62, the CPU 31 proceeds to step S91 of FIG. 18 where, based on a plot of the tensile force measured by the left tensile force sensor 14L with respect to time, it determines if the initial slope $\beta_L$ satisfies the relationship $|\beta_R|>|\beta'|$.

If it determines that the relationship $|\beta_L|>|\beta'|$ is satisfied, the CPU 31 proceeds to step S92 where it refers to a prescribed data bank using $|\beta_L|$ in order to calculate and determine the deployment timing period for the passenger restraining devices 35. It then proceeds to step S44 of FIG. 14. Meanwhile, if it determines that the relationship $|\beta_L|>|\beta'|$ is not satisfied, the CPU 31 proceeds to step S93 where it ends the control sequence directly without operating the passenger restraining devices 35.

By executing this kind of control sequence, the CPU 31 can determine whether or not to trigger the passenger restraining devices 35 during a left simple offset collision.

Next, the determination of whether or not to trigger the passenger restraining devices 35 during a front collision will be described using FIG. 19.

Figure 19:
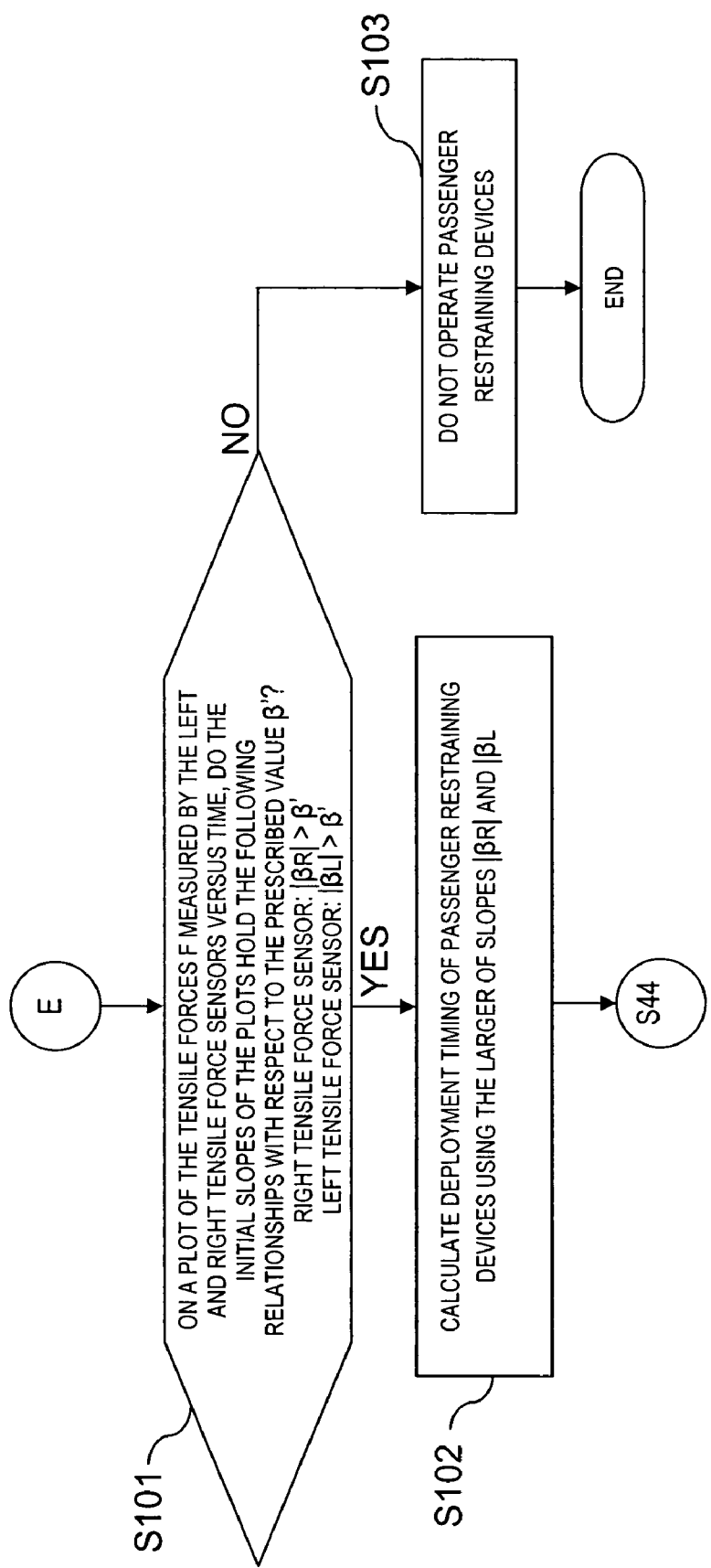
FIG. 19 is a flowchart showing the sequence of controls executed in order to determine whether or not to trigger the passenger restraining devices during a front collision.

After identifying the collision as a front collision in step S65 of FIG. 15 and determining the reference value $\beta'$ in step S68, the CPU 31 proceeds to step S101 of FIG. 19 where, based on a plot of the tensile force measured by the right tensile force sensor 14R with respect to time and a plot of the tensile force measured by the left tensile force sensor 14L with respect to time, it determines if the initial slopes $\beta_R$ and $\beta_L$ satisfy the relationships $|\beta_R|>|\beta'|$ and $|\beta_L|>|\beta'|$.

If it determines that both relationships $|\beta_R|>|\beta'|$ and $|\beta_L|>|\beta'|$ are satisfied, the CPU 31 proceeds to step S102 where it compares $|\beta_R|$ and $|\beta_L|$ and uses the larger of the two to refer to a prescribed data bank in order to calculate and determine the deployment timing period for the passenger restraining devices 35. It then proceeds to step S44 of FIG. 14. Meanwhile, if it determines that either (or both) of the relationships $|\beta_R|>|\beta'|$ and $|\beta_L|>|\beta'|$ is not satisfied, the CPU 31 proceeds to step S103 where it ends the control sequence directly without operating the passenger restraining devices 35.

By executing this kind of control sequence, the CPU 31 can determine whether or not to trigger the passenger restraining devices 35 during a front collision.

Next, the determination of whether or not to trigger the passenger restraining devices 35 during a left oblique offset collision will be described using FIG. 20.

Figure 20:
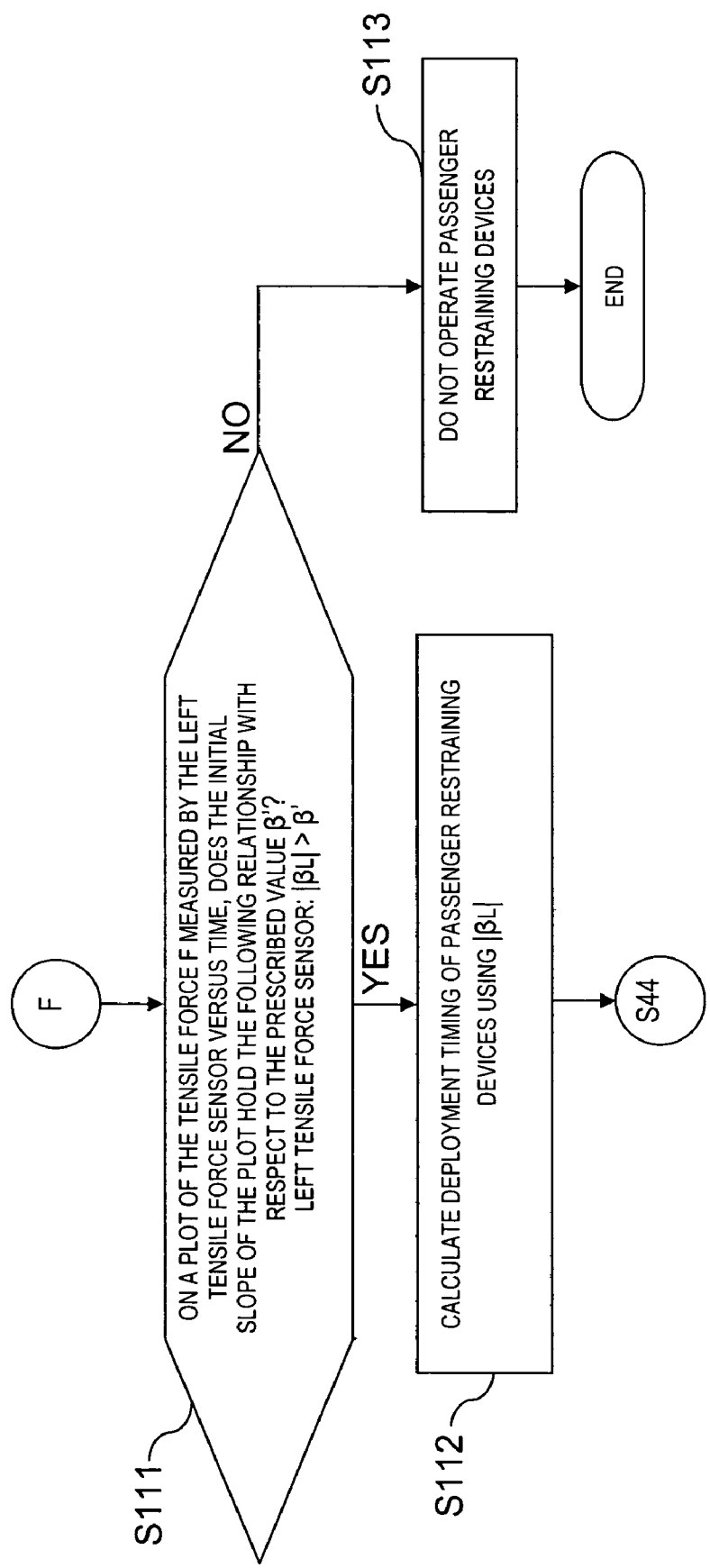
FIG. 20 is a flowchart showing the sequence of controls executed in order to determine whether or not to trigger the passenger restraining devices during a left oblique offset collision.

After identifying the collision as a left oblique offset collision in step S66 of FIG. 15 and determining the reference value $\beta'$ in step S69, the CPU 31 proceeds to step S111 of FIG. 20 where, based on a plot of the tensile force measured by the left tensile force sensor 14L with respect to time, it determines if the initial slope $\beta_L$ satisfies the relationship $|\beta_L|>|\beta'|$.

If it determines that the relationship $|\beta_L|>|\beta'|$ is satisfied, the CPU 31 proceeds to step S112 where it refers to a prescribed data bank using $|\beta_L|$ in order to calculate and determine the deployment timing period for the passenger restraining devices 35. It then proceeds to step S44 of FIG. 14. Meanwhile, if it determines that the relationship $|\beta_L|>|\beta'|$ is not satisfied, the CPU 31 proceeds to step S113 where it ends the control sequence directly without operating the passenger restraining devices 35.

By executing this kind of control sequence, the CPU 31 can determine whether or not to trigger the passenger restraining devices 35 during a left oblique offset collision.

Finally, the determination of whether or not to trigger the passenger restraining devices 35 during a right oblique offset collision will be described using FIG. 21.

Figure 21:
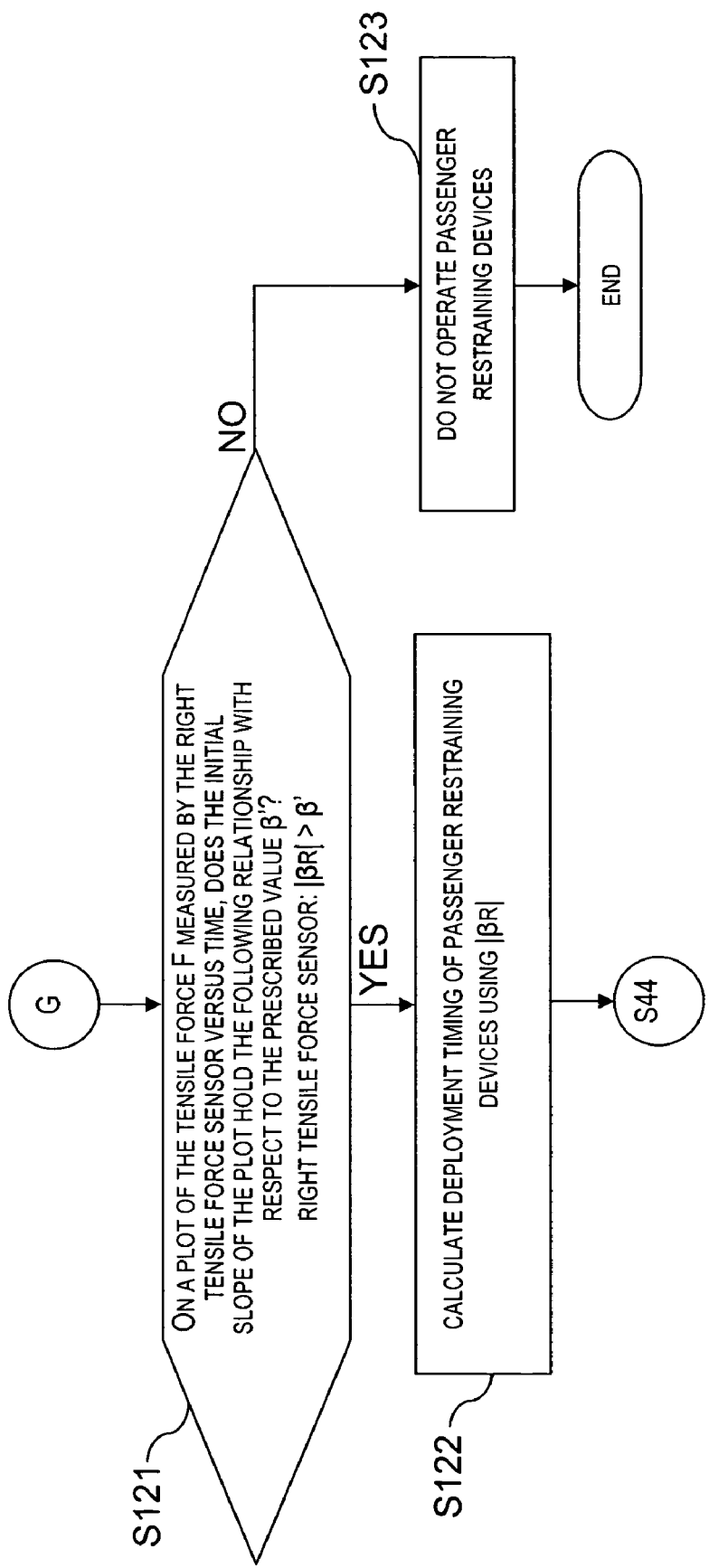
FIG. 21 is a flowchart showing the sequence of controls executed in order to determine whether or not to trigger the passenger restraining devices during a right oblique offset collision.

After identifying the collision as a right oblique offset collision in step S67 of FIG. 15 and determining the reference value $\beta'$ in step S70, the CPU 31 proceeds to step S121 of FIG. 21 where, based on a plot of the tensile force measured by the right tensile force sensor 14R with respect to time, it determines if the initial slope $\beta_R$ satisfies the relationship $|\beta_R|>|\beta'|$.

If it determines that the relationship $|\beta_R|>|\beta'|$ is satisfied, the CPU 31 proceeds to step S122 where it refers to a prescribed data bank using $|\beta_R|$ in order to calculate and determine the deployment timing period for the passenger restraining devices 35. It then proceeds to step S44 of FIG. 14. Meanwhile, if it determines that the relationship $|\beta_L|>|\beta'|$ is not satisfied, the CPU 31 proceeds to step S123 where it ends the control sequence directly without operating the passenger restraining devices 35.

By executing this kind of control sequence, the CPU 31 can determine whether or not to trigger the passenger restraining devices 35 during a right oblique offset collision.

Thus, the CPU 31 can tailor its determination of whether or not to trigger the passenger restraining devices 35 to the collision state and, when it triggers the passenger restraining devices 35, it can determine an appropriate triggering timing period.

As described in detail in the preceding paragraphs, similarly to the first embodiment, a vehicle collision state detecting device 10 in accordance with the second embodiment provides a simple system that can identify a wide range of collision states accurately and inexpensively by identifying the collision state based on the balance of the left and right tensile forces in the wire 15. Additionally, by determining the triggering timing for the passenger restraining devices 35 based on the amount of decrease with respect to time of the tensile forces measured by the right tensile force sensor 14R and the left tensile force sensor 14L, the control unit 22 can detect the collision speed of the vehicle, determine an appropriate triggering timing for the passenger restraining devices 35, and determine if it is necessary to trigger the passenger restraining devices 35. Since the triggering timing for the passenger restraining devices 35 and necessity of triggering the passenger restraining devices 35 can be determined without providing a floor sensor 18, the cost of the system can be reduced.

Alternate Locking Mechanism

Figure 22A:
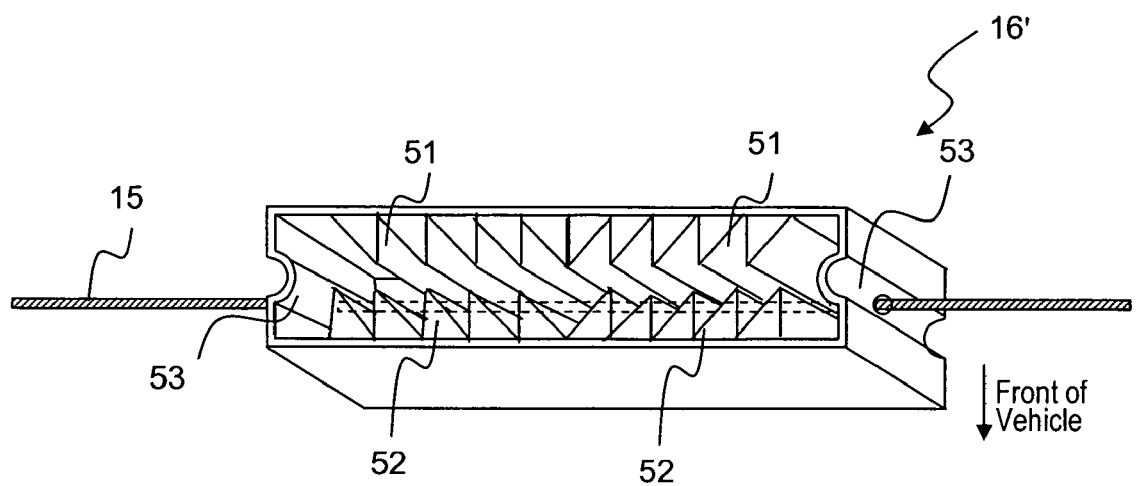
FIG. 22(A) is a perspective view showing an alternate lock mechanism for use with a vehicle collision state detecting device in accordance with an alternate embodiment of the present invention.

An alternate locking mechanism 16' for the vehicle collision state detecting device 10 will now be described. The locking mechanism 16' is configured similarly to the locking mechanism 16 used in the first and second embodiments. In other words, the locking mechanism 16' is substituted for the locking mechanism 16 used in the first and second embodiments. In particular, the lock mechanism 16' comprising a structural body in which mountain parts and valley parts are formed so as to face opposite one another and a wire arrangement in which the wire is disposed between the mountain parts and valley parts of the lock mechanism As shown in the perspective view of FIG. 22(A), the lock mechanism 16' has a so-called saw toothed form. In other words, the lock mechanism 16' has a saw-tooth-shaped mountain part 51, a saw-tooth-shaped valley part 52 that mate with the saw-tooth-shaped mountain part 51, and a pair of end support plates 53 that support the saw-tooth-shaped mountain part 51 and the saw-tooth-shaped valley part 52.

The mountain part 51 and valley part 52 of the lock mechanism 16' are arranged such that the saw-toothed-shaped portions thereof face toward each other. The valley part 52 is positioned more toward the front of the vehicle than the mountain part 51. The wire 15 is arranged between the faces of the mountain part 51 and the valley parts 52. The lock mechanism 16' is configured such that a line normal to the plane formed between the mountain part 51 and the valley part 52 is substantially parallel to the longitudinal direction of the vehicle. Notches or deformation areas are formed in the end support plates 53 of the lock mechanism 16'. The end support plates 53 are arranged more toward the sides of the vehicle than the mountain part 51 and valley part 52. The mountain parts 51 and valley parts 52 are supported between the end support plates 53.

Figure 22B:
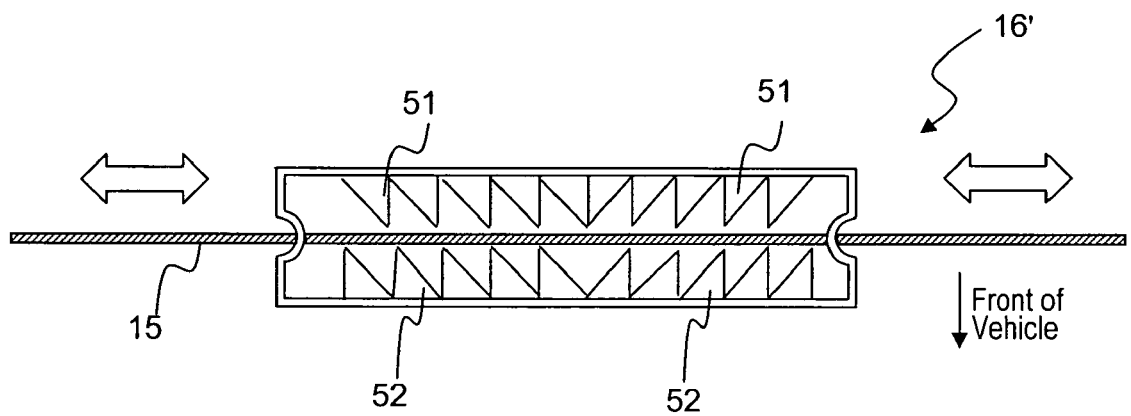
FIG. 22(B) is a plan view for explaining the operation of the alternate lock mechanism when a collision is not occurring in accordance with the alternate embodiment of the present invention.
Figure 22C:
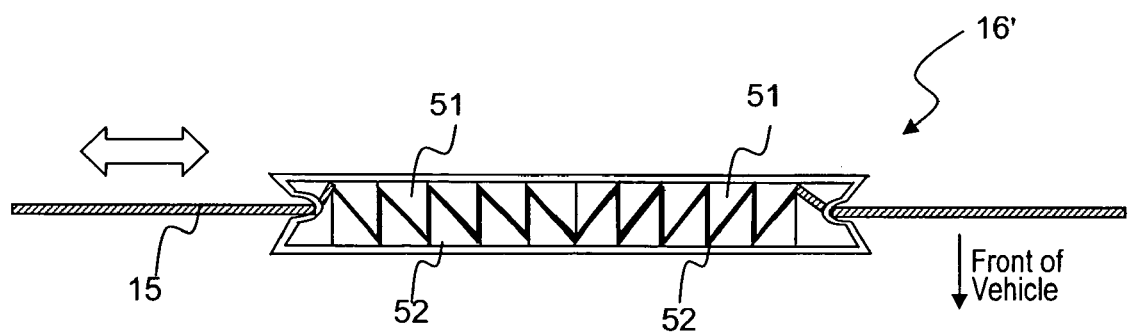
FIG. 22(C) is a plan view for explaining the operation of the alternate lock mechanism during a collision in accordance with the alternate embodiment of the present invention.

When a collision occurs, the valley part 52 moves toward the mountain part 51 as shown in the plan view of FIG. 22(C) due to the contact of the colliding object against the valley part 52. The support plates 53 (in which notches have been carved) of the lock mechanism 16 buckle and the valley part 52 meshes with the mountain part 51. As a result, the friction between the wire 15 and the mountain part 51 and valley part 52 increases and the wire 15 is locked. Thus, the wire 15 can no longer move in the widthwise direction of the vehicle and the lock mechanism 16' causes independent tensile forces to exist in the portions of the wire 15 extending to the left and right of the mountain part 51 and valley part 52.

When a collision is not occurring, as shown in the plan view of FIG. 22(B), the mountain part 51 and the valley part 52 do not overlap and the wire 15 can move freely in the axial direction of the wire 15, i.e., the widthwise direction of the vehicle. As a result, the lock mechanism 16' can allow equal tensile forces to exist in the portions of the wire 15 extending to the left and right of the mountain parts 51 and valley parts 52.

As described in detail in the preceding paragraphs, similarly to the first embodiment, a vehicle collision state detecting device 10 in accordance with the alternate embodiment is provided with a lock mechanism 16 that divides and fixes the wire 15 in a left or right offset collision such that the left and right portions of the wire 15 develop tensile forces that are independent of each other. This enables the right tensile force sensor 14R and the left tensile force sensor 14L to measure tensile force values that are different and these values can be used for identifying the collision state. Additionally, by providing a lock mechanism 16' that comprises a structural body in which mountain part 51 and valley part 52 face each other around the periphery of the wire 15, the left and right portions of the wire 15 can be made to carry independent tensile forces during a left or right offset collision using an extremely simple structure. Thus, an extremely simple structure can be used to make the right tensile force sensor 14R and the left tensile force sensor 14L measure tensile force values that are different and can be used for identifying the collision state.

The embodiments described heretofore are only examples of the present invention. The present invention is not limited to these embodiments. Arrangements other than those presented in the embodiments, including various changes in accordance with the design, are possible so long as they are within the scope of the technical concept of the invention.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function. The term "collision state" as used herein to the present invention refers to a type of a collision or impact that is based at least partially on the position in which the object contacts the vehicle in which the present invention was installed. In other words, the term "collision state" as used herein does not include a state of a collision that is based only on velocity or the force of the impact. Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-001235. The entire disclosure of Japanese Patent Application No. 2003-001235 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle collision state detecting device of a vehicle, comprising:
    a front vehicle structural section having a predetermined collision collapsing characteristic;
    a tension member with a prescribed initial tensile force extending in a width-wise direction of the front vehicle structural section;
    left and right tensile force sensors arranged on the front vehicle structural section to measure left and right tensile forces of the tension member; and
    a collision state identifying section configured to identify a collision state of the vehicle based on a comparison between the left and right tensile forces of the tension member measured by the left and right tensile force sensors.

2. The vehicle collision state detecting device recited in claim 1, wherein
    the front vehicle structural section includes
        a left side structural member configured with a rigidity balance to collapse inward when subjected to a left side load oriented in a widthwise direction of the vehicle;
        a right side structural member configured with a rigidity balance to collapse inward when subjected to a right side load oriented in the widthwise direction of the vehicle;
        a left side deformable member arranged on a forward tip end of the left side structural member;
        a right side deformable member arranged on a forward tip end of the right side structural member; and
        a bumper reinforcement arranged crosswise in the widthwise direction of the vehicle with end portions fixedly coupled at front end parts of the left and right side deformable members.

3. The vehicle collision state detecting device recited in claim 2, wherein
    the tension member includes a wire extending along the bumper reinforcement between the left and right structural members.

4. The vehicle collision state detecting device recited in claim 1, wherein
    the tension member includes a wire extending in the widthwise direction of the vehicle with end portions fixedly coupled at lateral parts of the front vehicle structural section.

5. The vehicle collision state detecting device recited in claim 1, wherein
    the collision state identifying section is configured to identify the collision state as a front collision when the left and right tensile forces of the tension member measured by the left and right tensile force sensors both decrease below the initial tensile force that existed before a collision and the left and right tensile forces of the tension member are approximately equal to each other after the collision.

6. The vehicle collision state detecting device recited in claim 1, wherein
    the collision state identifying section is configured to identify the collision state as a simple offset collision when one of the left and right tensile force sensors detects a decrease in one of the left and right tensile forces of the tension member below the initial tensile force that existed before the collision on the side where a collision occurred, and the other of the left and right tensile force sensors detects an increase in one of the left and right tensile forces of the tension member on the left and right tensile forces of the tension member above the initial tensile force that existed before the collision on the side where the collision did not occur.

7. The vehicle collision state detecting device recited in claim 1, wherein
    the collision state identifying section is configured to identify the collision state as a pole collision when the left and right tensile forces of the tension member measured by the left and right tensile force sensors both increase above the initial tensile force that existed before a collision.

8. The vehicle collision state detecting device recited in claim 1, wherein
    the collision state identifying section is configured to identify the collision state as an oblique offset collision when the left and right tensile forces of the tension member measured by the left and right tensile force sensors both decrease below the initial tensile force that existed before a collision and the left and right tensile forces of the tension member are not approximately equal to each other.

9. The vehicle collision state detecting device recited in claim 1, wherein
    the collision state identifying section is configured to determine a threshold value for activating at least one passenger restraining device in accordance with the collision state identified based on the comparison between the left and right tensile forces of the tension member measured by the left and right tensile force sensors.

10. The vehicle collision state detecting device recited in claim 9, further comprising
    a deceleration sensor configured to measure a deceleration of the vehicle; and
    the collision state identifying section being further configured to calculate a velocity waveform with respect to time based on the deceleration measured by the deceleration sensor and activate the passenger restraining device based on the calculated velocity waveform and the threshold value determined by the collision state identifying section.

11. The vehicle collision state detecting device recited in claim 1, wherein
    the collision state identifying section determines an activation timing with which a passenger restraining device will be activated and a passenger restraining force based on an amount of decrease with respect to time in the left and right tensile forces of the tension member measured by the left and right tensile force sensors.

12. The vehicle collision state detecting device recited in claim 1, wherein
    the front vehicle structural section is configured to deform such that left and right lateral side portions collapse inward relative to the vehicle at side locations, respectively, that are in front of a respective one of the left and right tensile force sensors when subjected to a load oriented in the widthwise direction of the vehicle.

13. The vehicle collision state detecting device recited in claim 1, further comprising
    a lock mechanism configured to divide and fix the tension member in such a manner that independent tensile forces are generated in left and right section of the tension member when a collision occurs.

14. The vehicle collision state detecting device recited in claim 13, wherein
the lock mechanism includes a plurality of protruding parts around a periphery of a plurality of stopper parts connected to the tension member and is configured in such a manner that when a load is imparted to the protruding parts, the structure surrounding the protruding parts deforms and causes the protruding parts and stopper parts to interfere with each other to restrict movement of the tension member.

15. The vehicle collision state detecting device recited in claim 14, wherein
the protruding parts of the lock mechanism have a saw-tooth-shaped mountain structure and the stopper parts of the lock mechanism has a saw-tooth-shaped valley structure that mates with the saw-tooth-shaped mountain structure with the tension member being arranged between the saw-tooth mountain structure and the saw-tooth valley structure.

16. The vehicle collision state detecting device as recited in claim 1, further comprising
at least one passenger restraining device configured and arranged to be selectively activated, and
a control unit configured and arranged to selectively activate the at least one passenger restraining device differently depending on the detected collision state identified by the collision state identifying section.

17. The vehicle collision state detecting device recited in claim 16, wherein
the control unit is configured and arranged to set an activation timing of the at least one passenger restraining device differently depending on the detected collision state identified by the collision state identifying section.

18. The vehicle collision state detecting device recited in claim 16, wherein
the at least one passenger restraining device includes at least one air bag, and
the control unit is configured and arranged to inflate the at least one passenger restraining device differently depending on the detected collision state identified by the collision state identifying section.

19. A vehicle collision state detecting device comprising:
front vehicle structural supporting means for providing structural support to a front portion of a vehicle;
tensioned means for providing a prescribed initial tensile force extending in a width-wise direction of the front vehicle structural section;
tensile force measuring means for measuring left and right tensile forces of the tensioned means; and
collision state identifying means for identifying a collision state of the vehicle based on a comparison between the left and right tensile forces of the tensioned means measured by the tensile force measuring means.

20. A vehicle collision state detecting device comprising:
a collision sensing device configured and arranged to be installed on a front portion of a vehicle to produce a collision state signal indicative of a detected collision state of the vehicle;
a collision state identifying section operatively coupled to the collision sensing device and configured to identify the detected collision state of the vehicle;
at least one passenger restraining device including a first air bag and a second air bag; and
a control unit configured and arranged to selectively inflate the at least one passenger restraining device differently depending on the detected collision state identified by the collision state identifying section, the control unit being configured and arranged to set an activation timing of the first and second air bag differently depending on the detected collision state identified by the collision state identifying section.

21. A method comprising:
providing a front vehicle structural section having a predetermined collision collapsing characteristic;
providing a tension member with a prescribed initial tensile force extending in a width-wise direction of the front vehicle structural section;
measuring left and right tensile forces of the tension member; and
identifying the collision state of the vehicle as at least one of two different preset collision conditions based on a comparison between the left and right tensile forces of the tension member; and
selectively activating at least one passenger restraining device differently depending on the collision state identified.

* * * * *